(12) United States Patent  (10) Patent No.: US 7,446,836 B2
Kurashima  (45) Date of Patent: Nov. 4, 2008

(54) LIQUID CRYSTAL DISPLAY DEVICE WITH REFLECTIVE AND TRANSMISSIVE REGIONS SPANNING ACROSS ADJACENT PIXELS OF A PIXEL ROW

(75) Inventor: Takeshi Kurashima, Azumino (JP)

(73) Assignee: Seiko Epson Corporation (JP)

( * ) Notice: Subject to any disclaimer, the term of this patent is extended or adjusted under 35 U.S.C. 154(b) by 393 days.

(21) Appl. No.: 11/273,342

(22) Filed: Nov. 14, 2005

(65) Prior Publication Data

US 2006/0114380 A1  Jun. 1, 2006

(30) Foreign Application Priority Data

Dec. 1, 2004  (JP)  ............................. 2004-348228
Oct. 31, 2005  (JP)  ............................. 2005-315760

(51) Int. Cl.
 *G02F 1/1335* (2006.01)
(52) U.S. Cl. ...................... 349/114; 349/152
(58) Field of Classification Search ................ 349/114, 349/149–152
See application file for complete search history.

(56) References Cited

U.S. PATENT DOCUMENTS

| 7,088,407 | B2 * | 8/2006 | Takizawa et al. ............ 349/114 |
| 7,088,408 | B2 | 8/2006 | Ozawa et al. |
| 7,161,645 | B2 * | 1/2007 | Wachi ........................ 349/106 |

| 2004/0075790 | A1 | 4/2004 | Wang |
| 2005/0001961 | A1 | 1/2005 | Koma et al. |

FOREIGN PATENT DOCUMENTS

| JP | 2003-270627 | 9/2003 |
| JP | 2003-295165 | 10/2003 |
| JP | 2004-151151 | 5/2004 |
| JP | 2004-226829 | 8/2004 |
| JP | 2004-240401 | 8/2004 |
| JP | 2004-325822 | 11/2004 |
| JP | 2004-333754 | 11/2004 |

* cited by examiner

*Primary Examiner*—David C. Nelms
*Assistant Examiner*—John Heyman
(74) *Attorney, Agent, or Firm*—Harness, Dickey & Pierce, P.L.C.

(57) ABSTRACT

A transflective liquid crystal display device includes a first substrate including first electrodes; a second substrate including second electrodes; a liquid crystal material interposed between the first and second substrates; and a display region including a plurality of pixels each having a reflective region and a transmissive region. The reflective and transmissive regions are arranged in strip shapes lying across pixel rows. The first substrate includes a layer-thickness adjusting layer adjusting retardation in the reflective and transmissive regions. The layer-thickness adjusting layer includes thick portions arranged in the reflective regions; thin portions arranged in the transmissive regions; step portions formed in the display region at boundaries between the thick and thin portions such that inclined planes are formed in a vertical direction; and relieving portions formed outboard the display region to reduce a step difference between the thick and thin portions.

11 Claims, 23 Drawing Sheets

LIQUID CRYSTAL DISPLAY DEVICE WITH REFLECTIVE AND TRANSMISSIVE REGIONS SPANNING ACROSS ADJACENT PIXELS OF A PIXEL ROW

REALTED APPLICATIONS

This application claims priority to Japanese Patent Application Nos. 2004-348228 filed Dec. 1, 2004 and 2005-315760 filed Oct. 31, 2005 which are hereby expressly incorporated by reference herein in its entirety.

BACKGROUND

1. Technical Field

The present invention relates to a liquid crystal display device, to a method of manufacturing a liquid crystal display device, and to an electronic apparatus. More particularly, the invention relates to a liquid crystal display device capable of preventing defects in display due to a multi-gap step difference, to a method of manufacturing a liquid crystal display device, and to an electronic apparatus provided with the liquid crystal display device.

2. Related Art

In general, liquid crystal display devices are used as image displaying devices in which a pair of substrates each having electrodes are arranged opposite to each other, and a voltage applied to a plurality of pixels positioned at the intersections of these electrodes is selectively turned on or off to modulate light passing through a liquid crystal material of pixel regions, thereby displaying images, such as figures or characters.

As the liquid crystal display device, a transflective liquid crystal display device capable of performing both reflective display and transmissive display is available. That is, in transmissive regions, light emitted from a backlight provided on the rear side of a substrate is incident on a liquid crystal panel, passes through a liquid crystal material layer, and is then emitted to the outside. On the other hand, in reflective regions, external light incident on the liquid crystal panel from the outside passes through the liquid crystal material layer and is then reflected from a reflective film. Then, the reflected light passes through the liquid crystal material layer again to be emitted to the outside. Since the transflective liquid crystal display device is provided with transmissive and reflective regions, it can display images using external light, such as sunlight, in the daytime or bright places, which makes it possible to reduce power consumption. In addition, the transflective liquid crystal display device can also display images using a backlight in the night or relatively dark places.

To improve the color forming property in both the reflective and transmissive regions of a transflective liquid crystal display device and optimize retardation therein, a liquid crystal display device having a so-called multi-gap structure has been proposed. More specifically, FIGS. 23A to 23C show a transflective liquid crystal display device in which a reflective layer 604 for defining a reflective region 631 and a transmissive region 632 is formed in a pixel 603, and a layer-thickness adjusting layer 606 is formed on the reflective layer 604 such that a portion thereof corresponding to the transmissive region 632 is opened (for example, see JP-A-2003-270627 (claims and FIG. 1)).

However, in the liquid crystal display device having the multi-gap structure disclosed in JP-A-2003-270627, since retardation is deteriorated in both the reflective regions and the transmissive regions, step portions of the layer-thickness adjusting layer corresponding to boundaries between the reflective regions and the transmissive regions cause defects in display.

Further, as an angle formed between the surface of the substrate and the wall of the step portion becomes larger, the adhesion of the electrodes formed in the step portions becomes lower. Therefore, in general, the step portions are formed to be inclined. Thus, when the surface of the substrate is viewed in the vertical direction (e.g., a plan view), the step portion has a predetermined width, and a region corresponding to the step portion causes defects in display, which results in the lowering of display characteristics, such as contrast.

Therefore, according to the invention, to address the above-mentioned problems, in a liquid crystal display device having a multi-gap structure, a layer-thickness adjusting layer for making the thicknesses of the liquid crystal material layer different from each other in the reflective region and the transmissive region is formed in a strip shape in a predetermined direction in the display region, to reliably ensure electrical connection between the electrodes formed on the layer-thickness adjusting layer outboard of the display region.

SUMMARY

An advantage of some aspects of the invention is that a liquid crystal display device is provided in which step portions between reflective regions and transmissive regions are steeply formed in a display region, and electrical connection between electrodes is ensured outboard of the display region, which makes it possible to ensure the electrical connection between the electrodes in the reflective regions and the transmissive region and to decrease the area of a display, defect region, resulting in an improvement in display characteristics. In addition, another advantage of some aspects of the invention is that a method of manufacturing the liquid crystal display device and an electronic apparatus including the liquid crystal display device are provided.

According to an aspect of the invention, a transflective liquid crystal display device includes a first substrate that has first electrodes; a second substrate that has second electrodes; a liquid crystal material that is interposed between the first substrate and the second substrate; and a display region that includes a plurality of pixels each having a reflective region and a transmissive region. The reflective regions and the transmissive regions are arranged in strip shapes so as to be laid across pixel rows each composed of pixels arranged in a given direction in the display region. The first substrate includes a layer-thickness adjusting layer to adjust retardation in the reflective regions and the transmissive regions. The layer-thickness adjusting layer includes thick layer portions that are arranged in the reflective regions; thin layer portions that are arranged in the transmissive regions; step portions that are formed in the display region at boundaries between the thick layer portions and the thin layer portions such that the inclined planes thereof are formed in the vertical direction; and relieving portions that are formed outboard of the display region to reduce a step difference between the thick layer portions and the thin layer portions. The first electrodes are formed on the layer-thickness adjusting layer so as to be laid across the pixel rows, and extend outboard of the display region, and the first electrodes formed in the reflective regions and the transmissive regions in the same pixel row are connected to each other on the relieving portions.

According to this structure, in the display region, the inclined planes are steeply formed at the boundaries between the thick layer portions and the thin layer portions, and the step portions between the thick layer portions and thin layer portions have a small width when the surface of the substrate is viewed in the vertical direction (e.g., a plan view), which makes it possible to reduce the area of a display defect region. Outboard of the display region, it is possible to prevent the breaking of the first electrodes due to the step difference between the thick layer portions and thin layer portions and thus to ensure electrical connection between the first electrodes formed in the reflective regions and the transmissive regions in the same pixel row. Therefore, the electrical connection between the first electrodes in one pixel can be ensured in the display region regardless of whether the first electrodes are broken due to the step portions, and the area of a display defect region can be reduced, which makes it possible to provide a liquid crystal display device having good display characteristics.

In the above-mentioned structure, it is preferable that, when the inclined planes in the display region are referred to as first inclined planes, each relieving portion includes a second inclined plane that is slanted at an angle smaller than the angle formed between the first inclined plane and the surface of the substrate.

According to this structure, in the display region, the step portions between the thick layer portions and thin layer portions have a small width when the surface of the substrate is viewed in the vertical direction, which makes it possible to reduce the area of a display defect region. In addition, outboard of the display region, it is possible to effectively prevent the breaking of the first electrodes formed on the inclined planes in the relieving portions and thus to ensure the electrical connection between the first electrodes.

Further, the angle formed between the inclined plane 15 and the surface 31a of the substrate means an angle determined in a range of 0 to 90° of two angles θA and θB which are formed by the surface of the substrate and the inclined plane shown in FIGS. 8A and 8B. Therefore, in FIG. 8A, the angle therebetween means the angle θB. In FIG. 8B, the angle therebetween means the angle θA.

Furthermore, in the above-mentioned structure, it is preferable that the relieving portions each include a plurality of step portions that connect the thick layer portion and the thin layer portion.

According to this structure, it is possible to reduce the height of the step portion included in each relieving portion and to effectively prevent the breaking of the first electrode formed on the relieving portion.

Moreover, according to another aspect of the invention, a transflective liquid crystal display device includes a first substrate that has first electrodes; a second substrate that has second electrodes; a liquid crystal material that is interposed between the first substrate and the second substrate; and a display region that includes a plurality of pixels each having a reflective region and a transmissive region. The reflective regions and the transmissive regions are arranged in strip shapes so as to be laid across pixel rows each composed of pixels arranged in a given direction in the display region. The first substrate includes a layer-thickness adjusting layer to adjust retardation in the reflective regions and the transmissive regions. The layer-thickness adjusting layer includes thick layer portions that are arranged in the reflective regions; thin layer portions that are arranged in the transmissive regions; and step portions that are formed, in the display region, at boundaries between the thick layer portions and the thin layer portions such that inclined planes thereof are formed in the vertical direction. The first electrodes are formed on the layer-thickness adjusting layer so as to be laid across the pixel rows, and extend outboard of the display region. A conductive material is arranged so as to be laid across portions of the first electrodes extending outboard of the display region, the first electrodes being formed in the reflective regions and the transmissive regions in the same pixel row.

According to this structure, in the display region, the step portions between the thick layer portions and thin layer portions have a small width when the surface of the substrate is viewed in the vertical direction, which makes it possible to reduce the area of a display defect region. In addition, outboard of the display region, a predetermined conductive material arranged so as to be laid across the first electrode makes it possible to ensure the electrical connection between the first electrodes formed in the transmissive regions and the reflective regions in the same pixel row. Therefore, the electrical connection between the first electrodes in one pixel can be ensured in the display region regardless of whether the first electrodes are broken due to the step portions, and the area of a display defect region can be reduced, which makes it possible to provide a liquid crystal display device having good display characteristics.

Further, in the above-mentioned structure, it is preferable that, in the display region, the angle formed between the inclined plane and the surface of the substrate is in a range of 60° to 90°.

According to this structure, in the display region, the step portions between the thick layer portions and thin layer portions have a small width when the surface of the substrate is viewed in the vertical direction, which makes it possible to reduce the area of a display defect region.

Furthermore, in the above-mentioned structure, it is preferable that the first electrodes in the reflective regions and the transmissive regions be electrically connected to each other at both sides of the display region.

According to this structure, it is possible to reliably ensure the electrical connection between the first electrodes in the reflective regions and the transmissive regions which are formed so as to be laid across the pixel rows each composed of pixels arranged in a given direction.

Moreover, in the above-mentioned structure, it is preferable that a slit be provided on a portion of the first electrode corresponding to the step portion of each pixel.

According to this structure, the step portions between the thick layer portions and the thin layer portions in the display region serve as non-electric field regions, and thus it is possible to reliably prevent defects in display.

Further, in the above-mentioned structure, it is preferable that the second substrate is an element substrate having TFD elements or TFT elements.

According to this structure, even in a liquid crystal display device having a type of switching element, it is possible to ensure the electrical connection between the first electrodes formed in the reflective region and the transmissive region in one pixel in the display region, and thus to reduce the area of a display defect region due to multi-gaps formed in the counter substrate.

According to still another aspect of the invention, there is provided a method of manufacturing a transflective liquid crystal display device including a first substrate that has first electrodes; a second substrate that has second electrodes; a liquid crystal material that is interposed between the first substrate and the second substrate; and a display region that includes a plurality of pixels each having a reflective region and a transmissive region. The reflective regions and the transmissive regions are arranged in strip shapes so as to be laid across pixel rows each composed of pixels arranged in a given direction in the display region. The method includes forming a photosensitive resin material layer on the first substrate; forming, to adjust retardation of the reflective regions and the transmissive regions, a layer-thickness adjusting layer which includes thick layer portions that are arranged in the reflective regions, thin layer portions that are arranged in the transmissive regions, step portions that are formed, in the display region, at boundaries between the thick layer portions and the thin layer portions such that inclined planes thereof are formed in the vertical direction, and relieving portions that are formed outboard of the display region to reduce a step difference between the thick layer portions and the thin layer portions; and forming the first electrodes on the layer-thickness adjusting layer so as to be laid across the pixel rows and to extend outboard of the display region, so that the first electrodes formed in the reflective regions and the transmissive regions in the same pixel row are connected to each other on the relieving portions.

According to this aspect, when the layer-thickness adjusting layer having the thick layer portions and the thin layer portions for forming the multi-gap structure is formed, in the display region, the inclined planes are formed in the vertical direction at the boundaries between the thick layer portions and the thin layer portions, which makes it possible to reduce the area of a display defect region. In addition, when the layer-thickness adjusting layer is formed, the relieving portions for reducing the step difference between the thick layer portions and the thin layer portions are formed outboard of the display region, which makes it possible to ensure the electrical connection between the electrodes on the thick layer portions and the thin layer portions. As a result, it is possible to effectively manufacture a liquid crystal display device having good display characteristics while preventing defects in display due to the breaking of the electrodes.

According to yet another aspect of the invention, there is provided a method of manufacturing a transflective liquid crystal display device including a first substrate that has first electrodes; a second substrate that has second electrodes; a liquid crystal material that is interposed between the first substrate and the second substrate; and a display region that includes a plurality of pixels each having a reflective region and a transmissive region. The reflective regions and the transmissive regions are arranged in strip shapes so as to be laid across pixel rows each composed of pixels arranged in a given direction in the display region. The method includes forming a photosensitive resin material layer on the first substrate; forming, to adjust retardation of the reflective regions and the transmissive regions, a layer-thickness adjusting layer which includes thick layer portions that are arranged in the reflective regions, thin layer portions that are arranged in the transmissive regions, and step portions that are formed, in the display region, at boundaries between the thick layer portions and the thin layer portions such that inclined planes thereof are formed in the vertical direction; forming the first electrodes on the layer-thickness adjusting layer so as to be laid across the pixel rows and to extend outboard of the display region; and arranging a conductive material so as to be laid across portions of the first electrodes extending outboard of the display region, the first electrodes being formed in the reflective regions and the transmissive regions in the same pixel row.

According to this aspect, when the layer-thickness adjusting layer having the thick layer portions and the thin layer portions for forming the multi-gap structure is formed, in the display region, the inclined planes are formed in the vertical direction at the boundaries between the thick layer portions and the thin layer portions, which makes it possible to reduce the area of a display defect region. In addition, a predetermined conductive material is arranged outboard of the display region, which makes it possible to ensure the electrical connection between the electrodes on the thick layer portions and the thin layer portions. As a result, it is possible to effectively manufacture a liquid crystal display device having good display characteristics while preventing defects in display due to the breaking of the electrodes.

Further, according to still yet another aspect of the invention, an electronic apparatus includes the above-mentioned liquid crystal display device.

According to this structure, since the electronic apparatus includes the liquid crystal display device capable of securing the electrical connection between the first electrodes formed in the reflective region and the transmissive region of one pixel and of reducing the display defect region, the invention can provide an electronic apparatus having good display characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
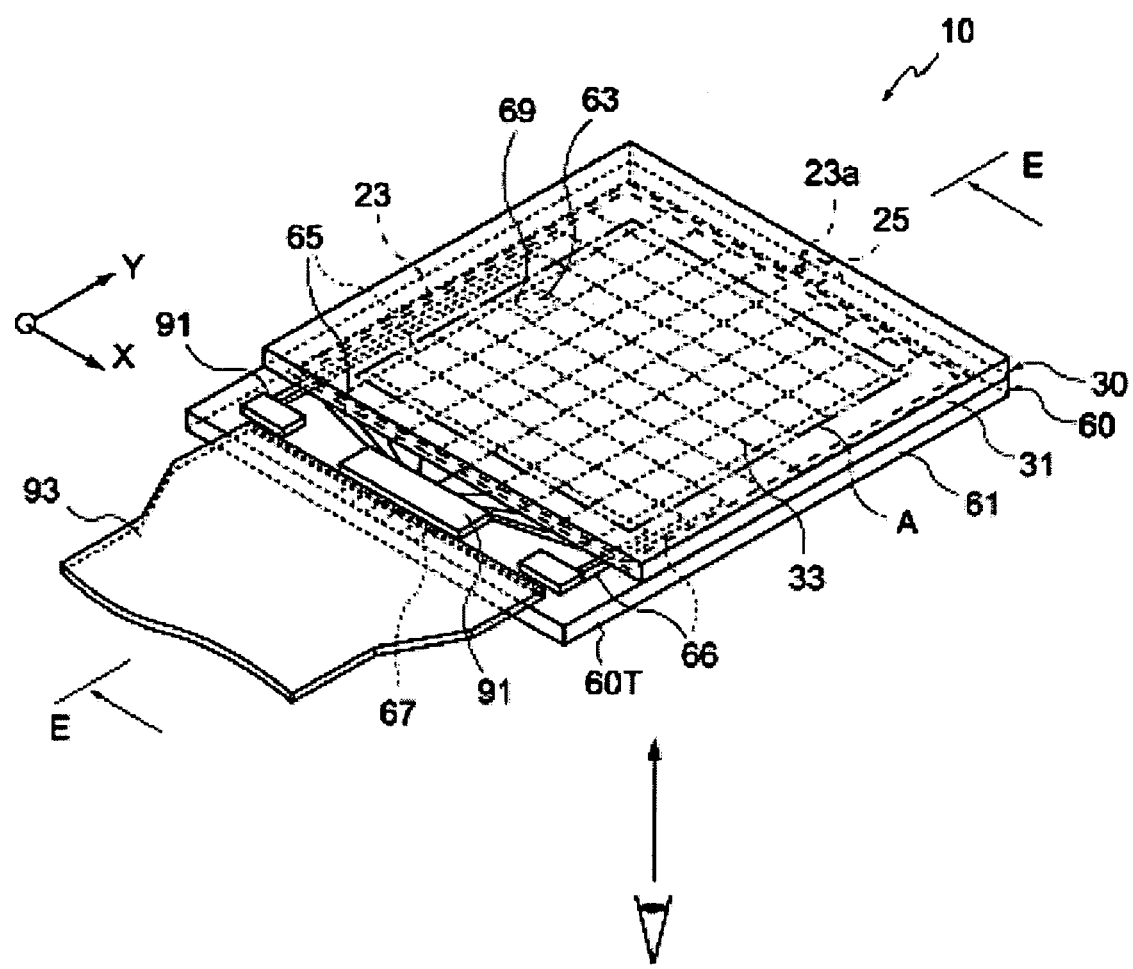
FIG. 1 is a perspective view schematically illustrating a liquid crystal display device according a first embodiment of the invention.

Hereinafter, preferred embodiments related to a liquid crystal display device, a manufacturing method of the liquid crystal display device, and an electronic apparatus provided with the liquid crystal display device according to the invention will be described with reference to the accompanying drawings. However, the embodiments are just illustrative examples, and the invention is not limited thereto. Therefore, various modifications and changes can be made without departing from the scope of the invention.

First Embodiment

According to a first embodiment, a transflective liquid crystal display device includes a first substrate having first electrodes, a second substrate having second electrodes, a liquid crystal material interposed between the first substrate and the second substrate, and a display region including a plurality of pixels each having a reflective region and a transmissive region.

The reflective regions and the transmissive regions are arranged in strip shapes so as to be laid across pixel rows each composed of pixels arranged in a given direction in the display region. The first substrate includes a layer-thickness adjusting layer to adjust retardation in the reflective regions and the transmissive regions. The layer-thickness adjusting layer includes thick layer portions that are arranged in the reflective regions; thin layer portions that are arranged in the transmissive regions; step portions that are formed in the display region at boundaries between the thick layer portions and the thin layer portions such that inclined planes thereof are formed in the vertical direction; and relieving portions that are formed outboard of the display region to reduce a step difference between the thick layer portions and the thin layer portions. The first electrodes are formed on the layer-thickness adjusting layer so as to be laid across the pixel rows, and extend outboard of the display region, and the first electrodes formed in the reflective regions and the transmissive regions in the same pixel row are connected to each other on the relieving portions.

Hereinafter, a liquid crystal display device including a color filter substrate having a predetermined layer-thickness adjusting layer therein and an element substrate having TFD (thin film diode) elements as switching elements, which is an example of the liquid crystal display device according to the first embodiment of the invention, will be described with reference to FIGS. 1 to 14. In these drawings, the same components have the same reference numerals, and repetitive description thereof will be appropriately omitted.

1. Basic Structure of Liquid Crystal Display Device

Figure 2:
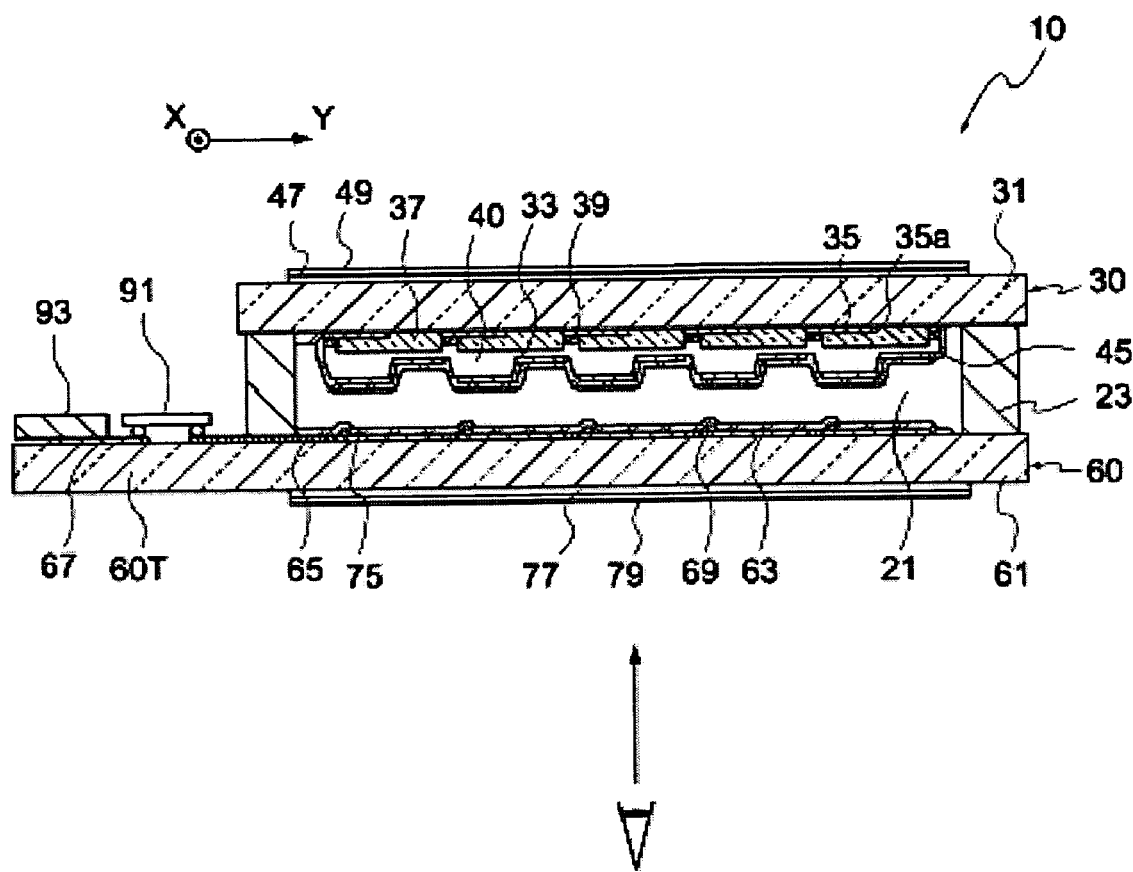
FIG. 2 is a cross-sectional view schematically illustrating the liquid crystal display device according the first embodiment of the invention.
Figure 3:
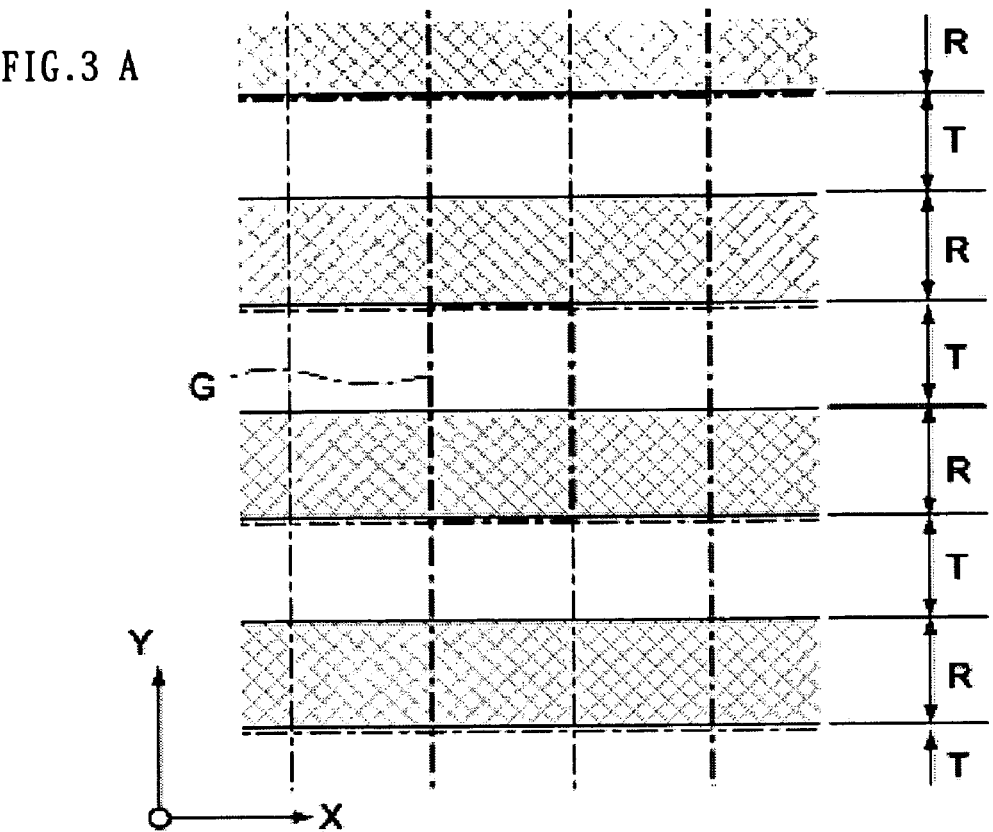
FIGS. 3A and 3B are diagrams illustrating the arrangement of reflective regions.
Figure 3:
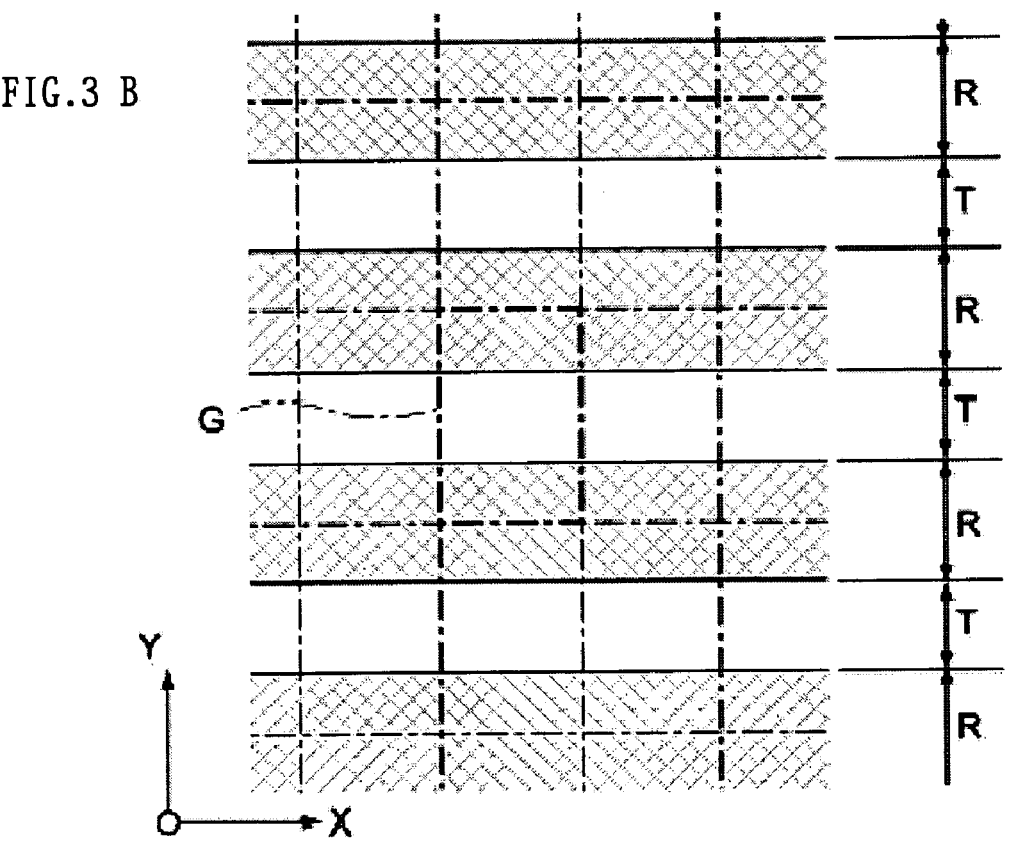

First, the basic structure of a liquid crystal display device 10, which is an example of the liquid crystal display device according to the first embodiment of the invention, that is, the structure of cells and wiring lines, will be described in detail with reference to FIGS. 1 and 2. FIG. 1 is a perspective view schematically illustrating the liquid crystal display device 10 according to this embodiment, and FIG. 2 is a schematic cross-sectional view taken along the line II-II of FIG. 1, as viewed in the direction of the arrow.

The liquid crystal display device 10 includes an element substrate 60 having an active matrix structure using TFT elements 69, which are two-terminal non-linear elements, as switching elements. In addition, although not shown, an illuminating device, such as a backlight or a front light, and a case may be provided to the liquid crystal display device 10, if necessary.

Further, in the liquid crystal display device 10, the element substrate 60 having a base substrate 61 composed of, for example, a glass substrate and a color filter substrate 30 having a base substrate 31 composed of, for example, a glass substrate are arranged opposite to each other and are bonded to each other with a sealing member 23, such as an adhesive, interposed therebetween. In addition, a liquid crystal material 21 is injected into a space surrounded by the element substrate 60, the color filter substrate 30, and the sealing member 23 through an opening portion 23a, and the opening portion 23a is sealed by a sealing material 25, thereby forming a cell structure. That is, the liquid crystal material 21 is filled into the space between the element substrate 60 and the color filter substrate 30.

Furthermore, a plurality of pixel electrodes 63 arranged in a matrix are formed on an inner surface of the base substrate 61 of the element substrate 60, that is, a surface of the base substrate 61 opposite to the color filter substrate 30, and a plurality of scanning electrodes 33 arranged in strip shapes are formed on an inner surface of the base substrate 31 of the color filter substrate 30, that is, a surface of the base substrate 31 opposite to the element substrate 60. In addition, each pixel electrode 63 is electrically connected to a data line 65 through the TFD element 69, and the scanning electrode 33 is electrically connected to an extending line 66 on the element substrate 60 through the sealing member 23 having conductive particles therein. Intersecting regions of the pixel electrodes 63 and the scanning electrodes 33 having the above-mentioned structure constitute a plurality of pixels (hereinafter, they may be referred to as pixel regions) arranged in a matrix, and the arrangement of the plurality of pixels constitutes a display region. In this way, when a voltage is applied to predetermined pixels, an electric field is generated to the liquid crystal material 21 of the pixels, which makes it possible to display images, such as figures or characters, in the entire display region.

Further, the element substrate 60 includes a projecting portion 60T protruding from the edge of the color filter substrate 30, and external connection terminals 67 composed of some of the data lines 65, some of the extending lines 66, and a plurality of wiring lines separately formed therefrom are formed on the projecting portion 60T.

In addition, a driving semiconductor device (driving IC) 91 having, for example, a liquid crystal driving circuit therein is connected to end portions of the data lines 65 and the extending lines 66. The driving semiconductor device (driving IC) 91 is connected to some of the external connection terminals 67 facing the display region, and a flexible circuit board 93 is connected to the other terminals.

2. Reflective Region and Transmissive Region

Furthermore, the liquid crystal display device of the invention is of a transflective type, and the reflective regions and the transmissive regions are arranged in strip shapes so as to be laid across pixel rows each composed of pixels arranged in a given direction in the display region. That is, as shown in FIGS. 3A and 3B, in the liquid crystal display device having TFD elements therein according to this embodiment, reflective regions R and transmissive regions T are alternately arranged in strip shapes for every pixel row composed of pixels G which are arranged in a given direction (X direction) orthogonal to the data lines on the element substrate. In addition, FIGS. 3A and 3B and FIG. 4 are partially enlarged views of the liquid crystal display device as viewed in a direction perpendicular to the display surface.

In FIG. 3A, the transmissive region T is arranged in the upper half of each pixel G, and the reflective region R is arranged in the lower half thereof. Therefore, the transmissive regions T and the reflective regions are arranged in strip shapes as a whole. In addition, in FIG. 3B, the reflective regions R are arranged in the upper and lower portions of each pixel G, and the transmissive region T is arranged at the central portion thereof so as to be interposed between the reflective regions R. Therefore, the transmissive regions T and the reflective regions R are arranged in strip shapes as a whole.

A reflective film having apertures corresponding to the transmissive regions T therein makes it possible to arrange the reflective regions R and the transmissive regions T in predetermined regions in the color filter substrate or the element substrate. In addition, in the liquid crystal display device according to this embodiment, the reflective film is formed on the color filter substrate.

Figure 4:
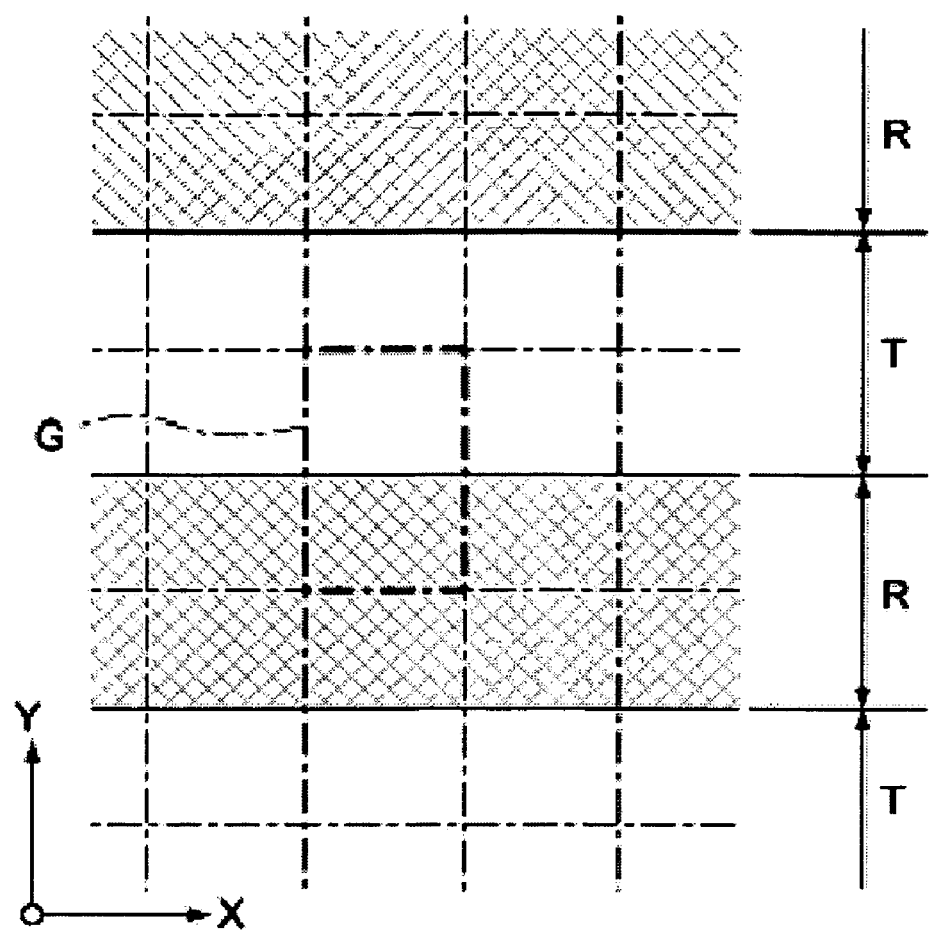
FIG. 4 is a diagram illustrating a modification of the arrangement of the reflective regions.
Figure 5:
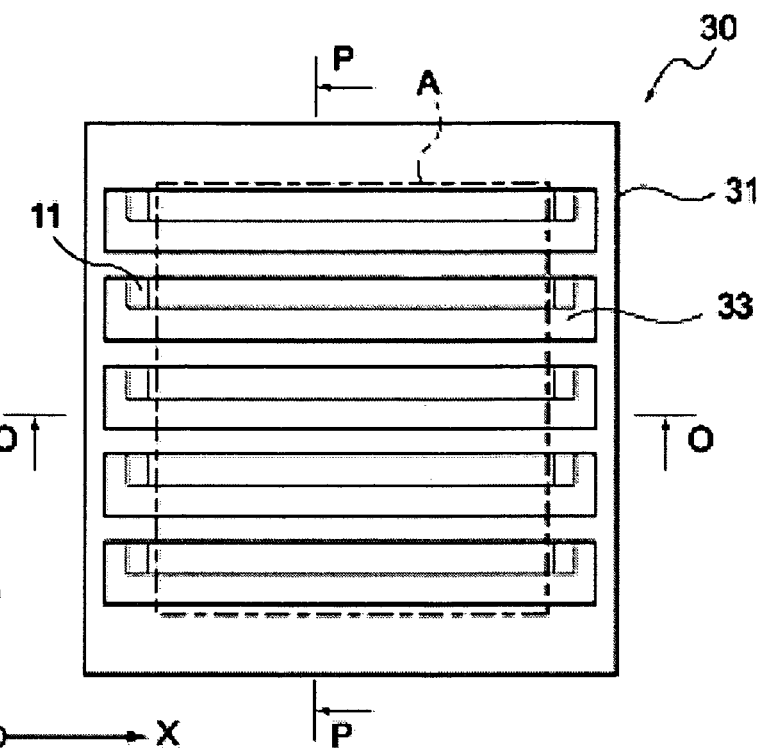
FIG. 5A is a plan view of a color filter substrate used for the liquid crystal display device according to the first embodiment.
FIGS. 5B and 5C are cross-sectional views of the color filter substrate used for the liquid crystal display device according the first embodiment.
Figure 5:
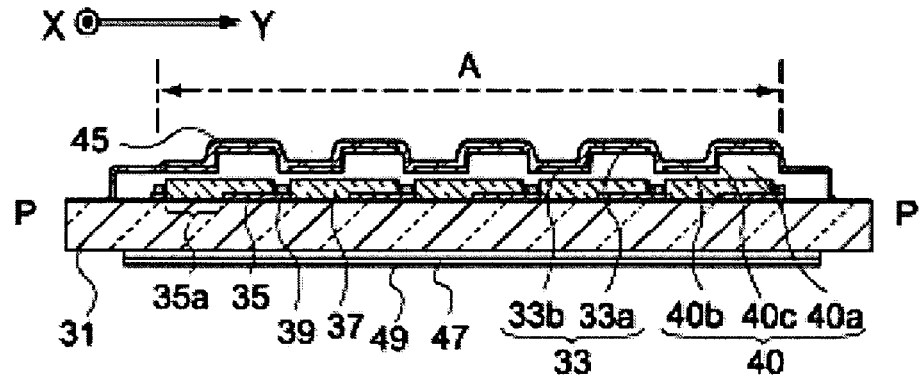
Figure 5:
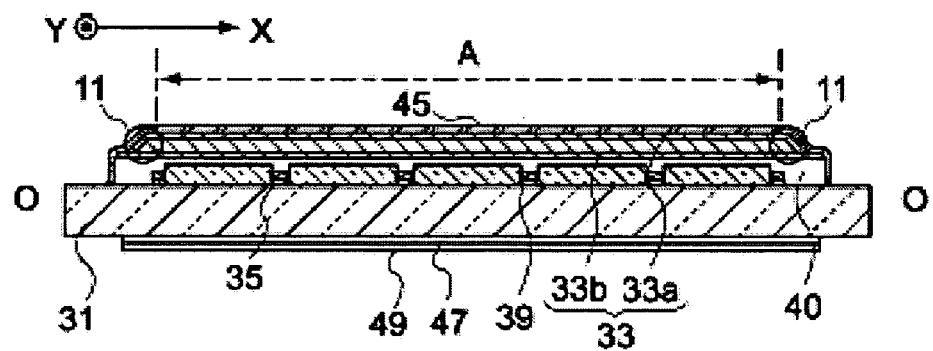
Figure 6:
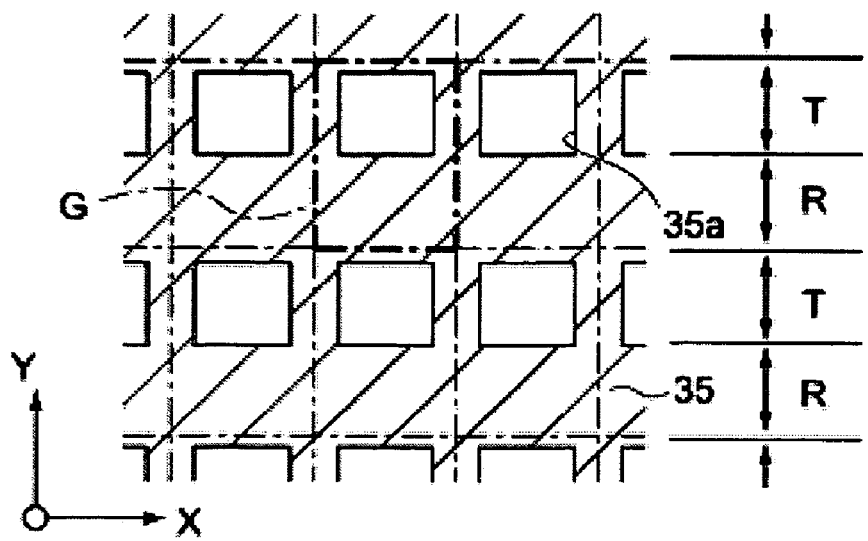
FIGS. 6A to 6C are diagrams illustrating the plan-view shape of a reflective film.
Figure 6:
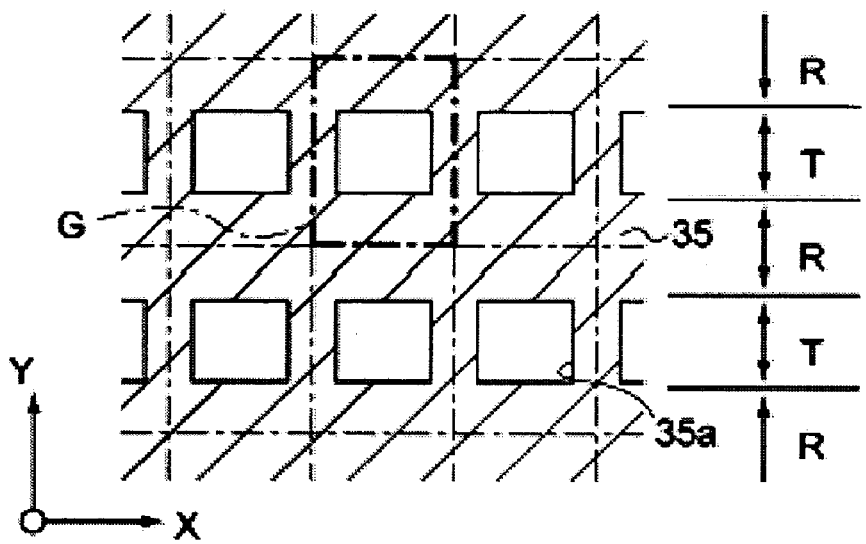
Figure 6:
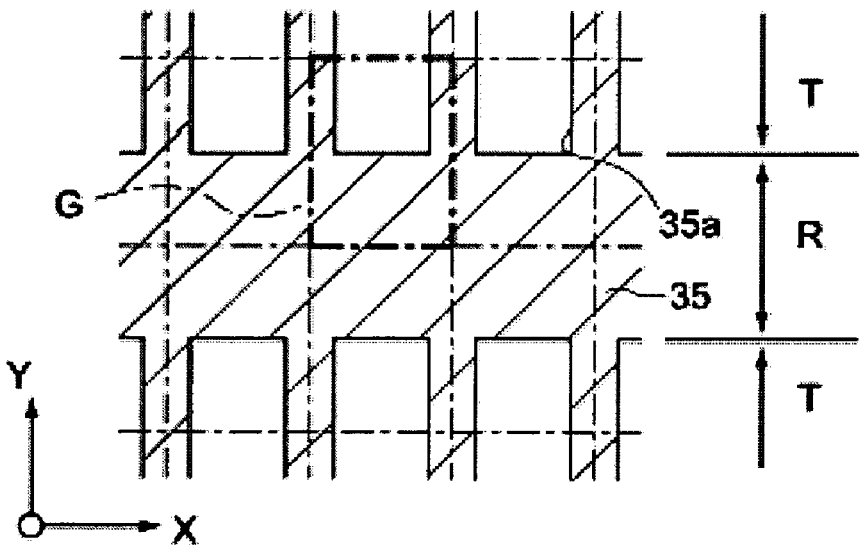
Figure 7:
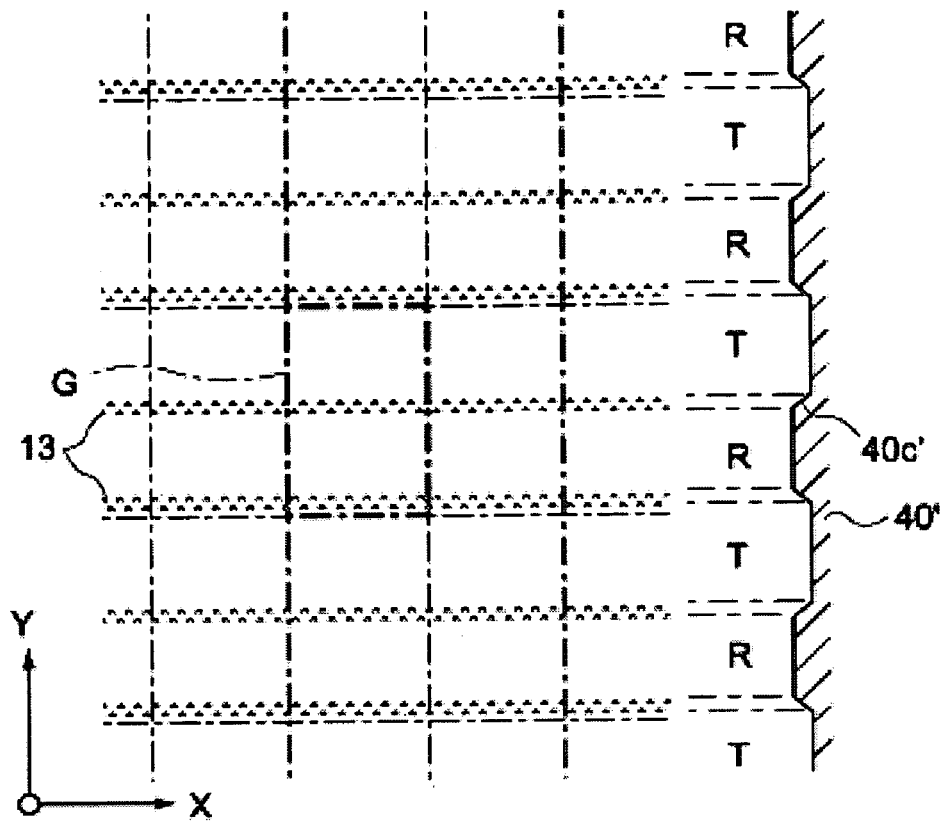
FIG. 7A is a diagram illustrating a display defect region of a liquid crystal display device according to the related art.
FIG. 7B is a diagram illustrating a display defect region of the liquid crystal display device according to the first embodiment.
Figure 7:
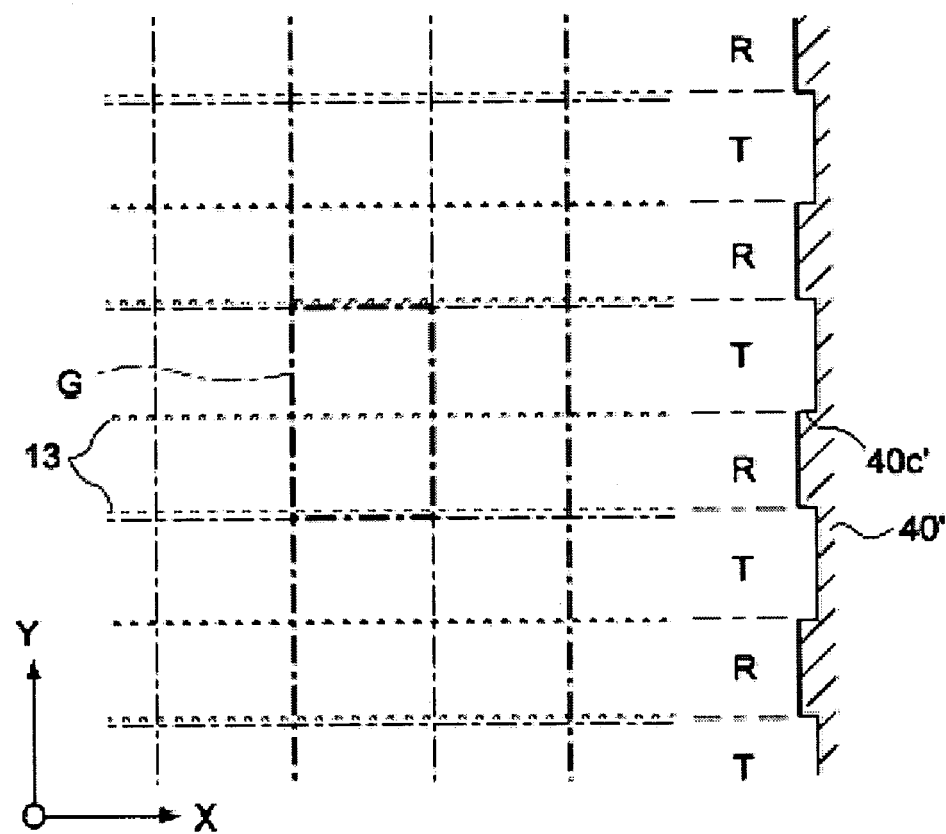
Figure 8:
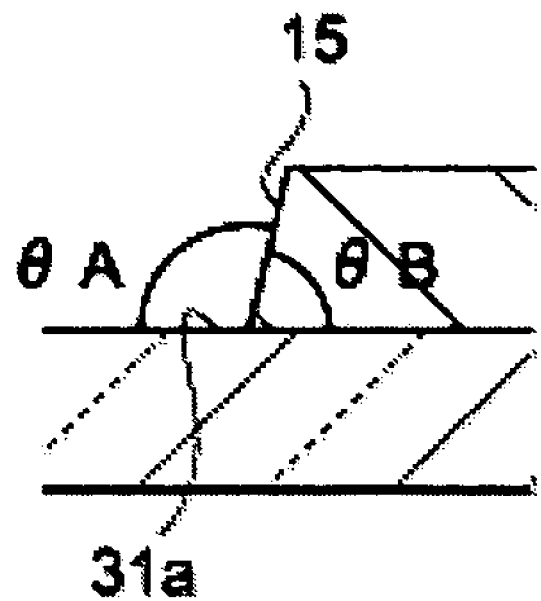
FIGS. 8A and 8B are cross-sectional views illustrating an angle formed between an inclined plane and a surface of a substrate.
Figure 8:
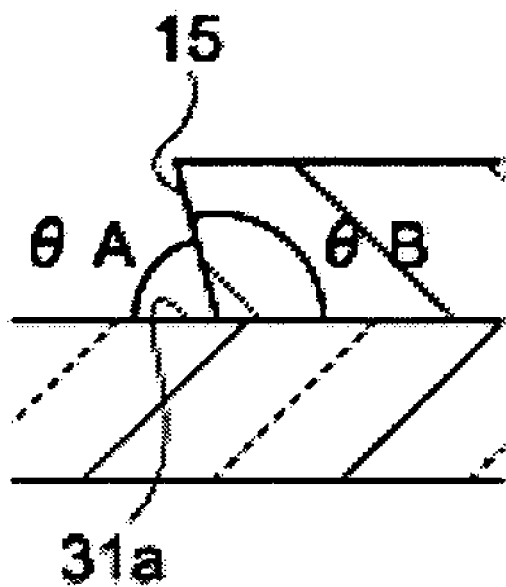

As shown in FIG. 4, it is preferable that, when the reflective regions and the transmissive regions are arranged, the reflective regions R be arranged on the sides of adjacent pixels G opposite to each other. For example, in FIG. 4, the pixels G each having an upper half in which the transmissive region T is arranged and a lower half in which the reflective region R is arranged and the pixels G each having an upper half in which the reflective region R is arranged and a lower half in which the transmissive region T is arranged are alternately disposed in each pixel column.

In this way, even when multi-gaps are formed, it is possible to reduce a step difference which may cause display defects in one pixel.

3. Color Filter Substrate (1) Basic Structure

Next, the color filter substrate 30 used for the liquid crystal display device 10 of this embodiment will be described in detail with reference to FIGS. 5A to 13C.

FIG. 5A is a plan view of the color filter substrate 30. FIG. 5B is a cross-sectional view taken along the line VB-VB of FIG. 5A, as viewed in the direction of the arrow. FIG. 5C is a cross-sectional view taken along the line VC-VC of FIG. 5A, as viewed in the direction of the arrow. As shown in FIG. 5B, basically, the color filter substrate 30 is formed by sequentially laminating a reflective film 35, a light shielding film 39, a colored layer 37, a layer-thickness adjusting layer 40, and the scanning electrodes 33 on the base substrate 31 composed of a glass substrate. In addition, an alignment film 45 for controlling the arrangement of the liquid crystal material is formed on the scanning electrodes 33, and a retardation plate (a quarter-wave plate) 47 and a polarizing plate 49 are formed on a surface of the base substrate 31 opposite to the surface having, for example, the scanning electrodes 33 thereon to display a clear image.

(2) Reflective Film

Further, the reflective film 35 formed on the color filter substrate 30 is formed of, for example, a metallic material, such as aluminum, and has apertures 35a corresponding the transmissive regions T. In the reflective regions R, the reflective film 35 reflects external light, such as sunlight, to perform reflective display. In the liquid crystal display device of the invention, the reflective regions R are arranged so as to be laid across the pixel rows each composed of pixels which are arranged in a given direction in the display region, and thus the reflective film 35 has, for example, patterns shown in FIGS. 6A to 6C.

FIG. 6A shows the reflective film 35 on the color filter substrate having the reflective regions. R and the transmissive regions T shown in FIG. 3A arranged therein. FIG. 6B shows the reflective film 35 on the color filter substrate having the reflective regions R and the transmissive regions T shown in FIG. 3B arranged therein. FIG. 6C shows the reflective film 35 on the color filter substrate having the reflective regions R and the transmissive regions T shown in FIG. 4 arranged therein.

(3) Light Shielding Film

The light shielding film 39 functions to prevent color materials from being mixed with each other between adjacent pixels G, and thus to obtain an image with high contrast. As the light shielding film 39, any of the following films can be used: a metal film made of, for example, chromium (Cr) or molybdenum (Mo); a film formed by dispersing three coloring materials of R (red), G (green), and B (blue) in a base member other than resin; and a film formed by dispersing a coloring material, such as a black pigment or dye, in a base member other than resin. In addition, the light shielding film can be formed by a combination of three coloring materials of R (red), G (green), and B (blue).

(4) Colored Layer

Further, the colored layer 37 is generally formed by dispersing a coloring material, such as pigment or dye, in a transparent resin, thereby displaying a predetermined color. For example, the color of the colored layer 37 is formed by a combination of R (red), G (green), and B (blue) color filters, but the color is not limited thereto. For example, the color can be formed by a combination of complementary colors, such as Y (yellow), M (magenta), and C (cyan), or by a combination of other colors.

The colored layers 37 are generally arranged in a strip pattern, but they may be arranged in various patterns, such as an oblique mosaic pattern and a tilted pattern.

(5) Layer-Thickness Adjusting Layer

Furthermore, in the liquid crystal display device 10 according to this embodiment, the layer-thickness adjusting layer 40 formed of, for example, an organic photosensitive resin material, such as acrylic resin or epoxy resin, or an inorganic material, such as SiN or $SiO_2$, is formed on the color filter substrate 30. As shown in FIGS. 5A to 5C, the layer-thickness adjusting layer 40 includes thick layer portions 40a arranged in the reflective regions R and thin layer portions 40b arranged in the transmissive regions T. In a display region A, inclined planes 40c are formed in the vertical direction in step portions between the thick layer portions 40a and the thin layer portions 40b. Relieving portions 11 for reducing the step difference between the thick layer portions 40a and the thin layer portions 40b are formed outboard of the display region A.

That is, in a liquid crystal display device having a multi-gap structure in which the reflective region of the liquid crystal material layer has a thickness smaller than the transmissive region, to optimize retardation in the reflective region and the transmissive region, the layer-thickness adjusting layer is formed such that the step difference between the thick layer portion and the thin layer portion is small in the display region, as viewed in a direction perpendicular to the surface of the substrate. On the other hand, the relieving portions for preventing the scanning electrodes formed on the step portions between the thick layer portions and the thin layer portions of the layer-thickness adjusting layer from being broken are formed outboard of the display region to ensure electrical connection between the scanning electrodes formed in the reflective region and the transmissive region in each pixel.

Therefore, it is possible to prevent errors in operation due to the breaking of the scanning electrodes and to reduce the area of a display defect region due to the step difference. In addition, it is possible to optimize retardation in both the reflective region and the transmissive region, and thus to achieve a liquid crystal display device having good display characteristics.

Figure 23:
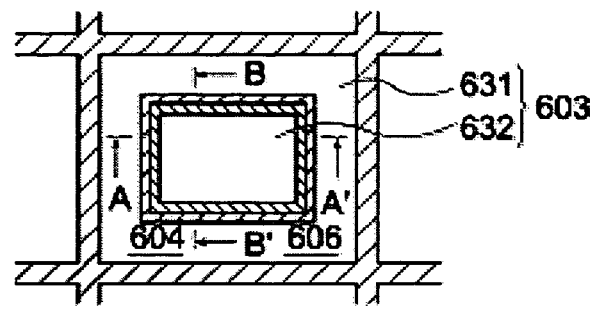
FIGS. 23A to 23C are diagrams illustrating the structure of a liquid crystal display device having a multi-gap structure according to the related art.
Figure 23:
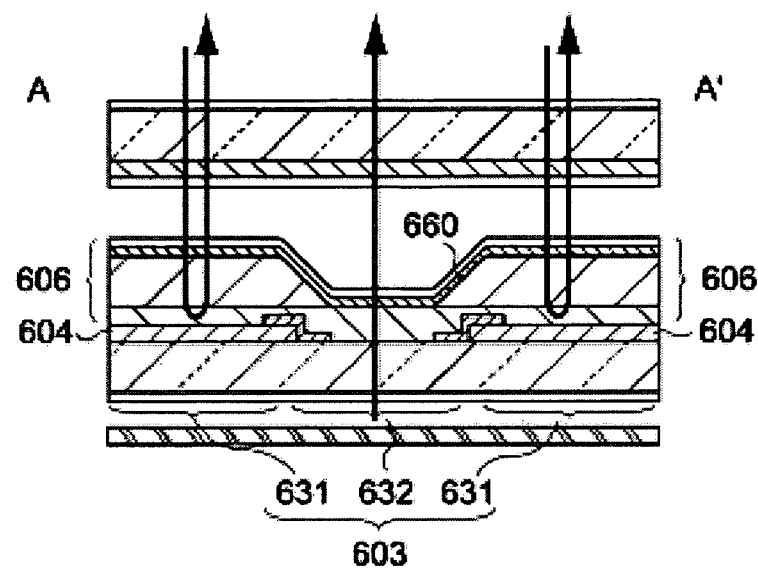
Figure 23:
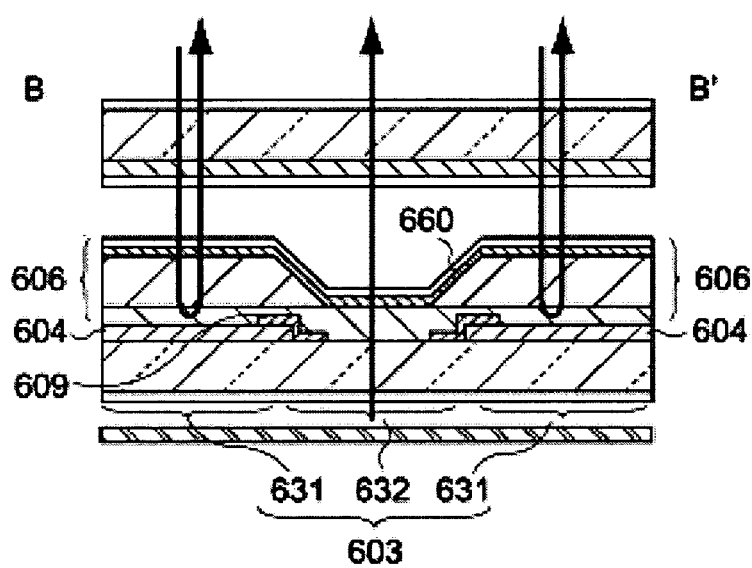

More specifically, as shown in FIG. 23B, a layer-thickness adjusting layer for constituting a multi-gap structure according to the related art is formed such that an inclined plane in a step portion 660 between the thick layer portion arranged in the reflective region R and the thin portion arranged in the transmissive region T has a relatively small inclination angle. The reason is that, when the inclined plane is vertically formed in the step portion, defects in formation may occur in the scanning electrode formed in the step portion, which causes the scanning electrode to be broken. However, the step portion has inappropriate retardation in both the reflective region and the transmissive region. Therefore, in this case, as shown in FIG. 7A, the area of a region corresponding to the inclined plane as viewed in a direction perpendicular to the surface of the substrate relatively increases, and thus the area of a display defect region 13 increases.

On the other hand, in the liquid crystal display device according to the invention, the inclined plane in the step portion between the thick layer portion and the thin layer portion is vertically formed. Therefore, as shown in FIG. 7B, the area of a region corresponding to the inclined plane as viewed in a direction perpendicular to the surface of the substrate relatively decreases, and thus the area of the display defect region 13 decreases. In addition, FIGS. 7A and 7B show a condition of the display defect region 13 that occurs because an inclined plane 40c' of the layer-thickness adjusting layer 40' leans.

To reduce the width of the step portion between the thick layer portion and the thin layer portion as viewed in a direction perpendicular to the surface of the substrate, it is preferable that an angle formed between the inclined plane and the surface of the substrate be in a range of 60° to 90°.

When the angle is smaller than 60°, the width of the inclined plane as viewed in the direction perpendicular to the surface of the substrate becomes relatively large although the width is varied according to the thickness of the layer-thickness adjusting layer, which results in an increase in the area of the display defect region. On the other hand, when the angle is larger than 90°, the width of the inclined plane as viewed in the direction perpendicular to the surface of the substrate is zero, which makes it possible to reduce the area of the display defect region to the minimum. However, in general, the step portion is formed by performing multiple exposure or halftone exposure on a photosensitive resin material, and thus optical rotation may occur in light passing through a photo mask, which results in low reproducibility.

Therefore, the angle between the inclined plane and the surface of the substrate in the step portion between the thick layer portion and the thin layer portion is preferably in a range of 70° to 88°, and more preferably, in a range of 80° to 85°.

In addition, the angle between the inclined plane 15 and the surface 31a of the substrate means an angle determined in a range of 0 to 90° of two angles θA and θB which are formed by the surface of the substrate and the inclined plane shown in FIGS. 8A and 8B. Therefore, in FIG. 8A, the angle therebetween means the angle θB. In FIG. 8B, the angle therebetween means the angle θA.

However, in the case in which the inclined plane is formed in the vertical direction in the step portion between the thick layer portion and the thin layer portion, in a manufacturing process, when the scanning electrodes are formed on the layer-thickness adjusting layer, the electrodes may be non-uniformly formed in the step portions. In this case, for example, the scanning electrode in the reflective region and the scanning electrode in the transmissive region of each pixel are discontinuously formed, which makes it difficult to ensure electrical connection therebetween. As a result, errors in operation occur.

As shown in FIGS. 5A to 5C, the relieving portions 11 for reducing the step difference between the thick layer portion 40a and the thin layer portion 40b are formed outboard the display region A. Therefore, it is possible to ensure the electrical connection between the scanning electrode 33a in the reflective region and the scanning electrode 33b in the transmissive region of each pixel by the relieving portions 11, and thus to prevent errors in operation caused by the breaking of the scanning electrode 33. That is, for example, even when the scanning electrode in the reflective region and the scanning electrode in the transmissive region of one pixel are not connected to each other, the electrical connection between the scanning electrode in the reflective region and the scanning electrode in the transmissive region is ensured outboard of the display region. Therefore, it is possible to apply a voltage to both the reflective region and the transmissive region in one pixel.

Figure 9:
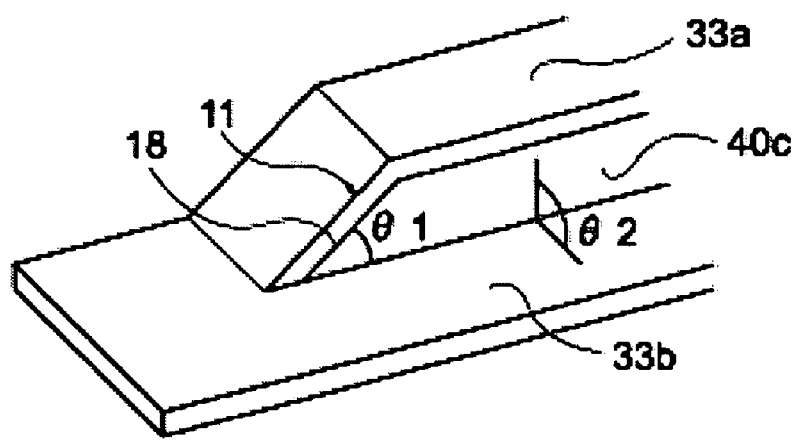
FIG. 9 is a diagram illustrating a relieving portion including a predetermined inclined plane.
Figure 9:
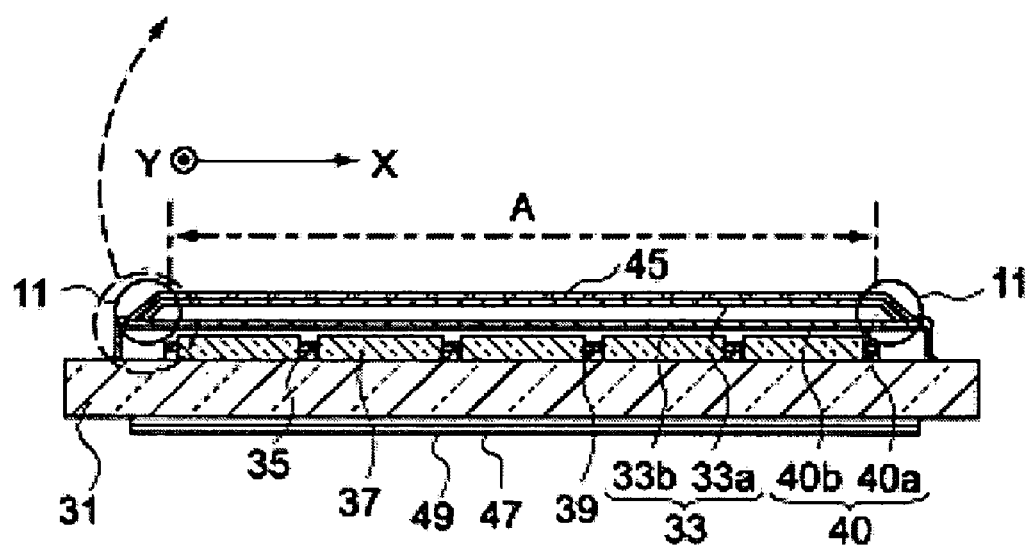

As shown in FIG. 9, for example, when the inclined plane in the display region is referred to as a first inclined plane 40c, the relieving portion 11 can include a second inclined plane 18 which is slanted at an angle smaller than an angle θ2 formed between the first inclined plane 40c and the surface of the substrate. That is, when the inclined plane is steeply formed in the step portion between the thick layer portion and the thin layer portion, defects in formation occur in the transparent electrode formed in the step portion. As a result, the breaking of the electrode easily occurs. Therefore, the inclined plane in the step portion between the thick layer portion and the thin layer portion is formed outboard of the display region at a smaller angle than that of the step portion in the display region, which makes it possible to ensure the electrical connection between the electrode formed in the reflective region and the electrode formed in the transmissive region of one pixel outboard of the display region.

However, when the inclined plane is excessively gently formed, the area of a frame region outside the display region may increase. Therefore, the angle between the surface of the substrate and the inclined plane in the step portion between the thick layer portion and the thin layer portion outboard of the display region is preferably in a range of 30° to 60°, and more preferably, in a range of 40° to 50°.

Figure 10:
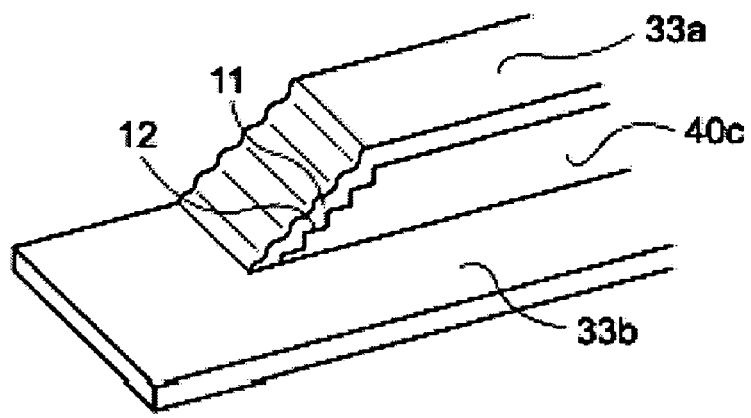
FIG. 10 is a diagram illustrating a relieving portion having a plurality of step portions.
Figure 10:
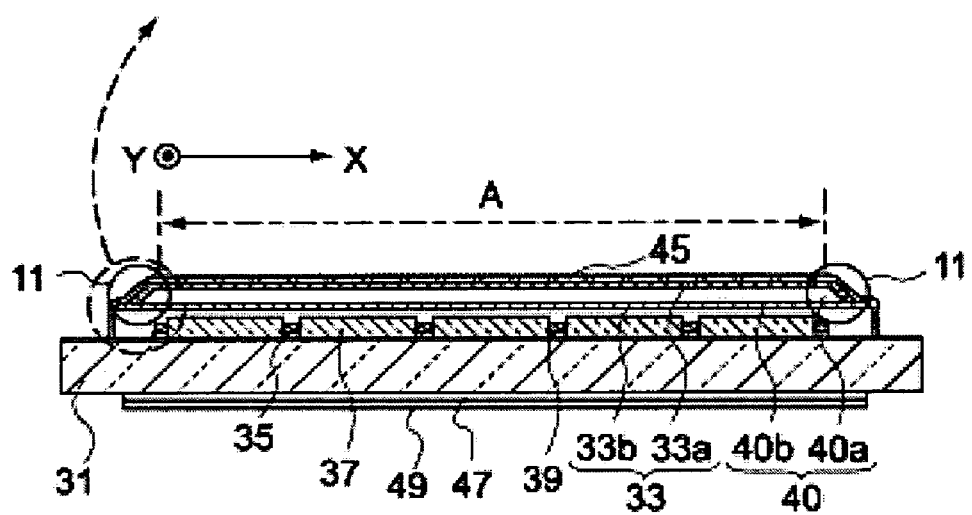
Figure 11:
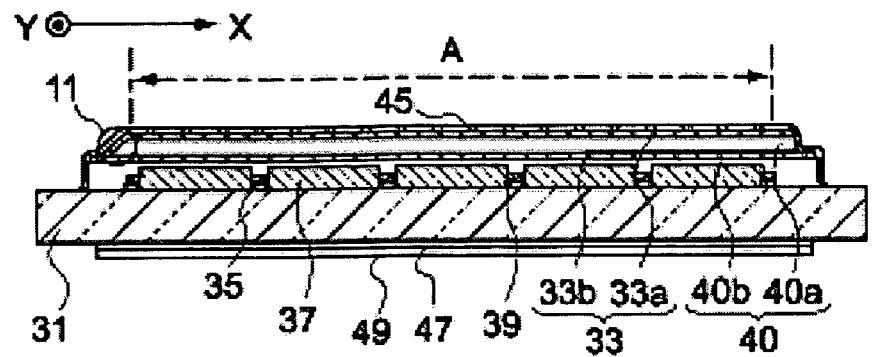
FIG. 11A is a cross-sectional view illustrating a color filter substrate having a relieving portion provided on one outer side of a display region.
FIG. 11B is a cross-sectional view illustrating a color filter substrate having relieving portions provided on both sides of the display region.
Figure 11:
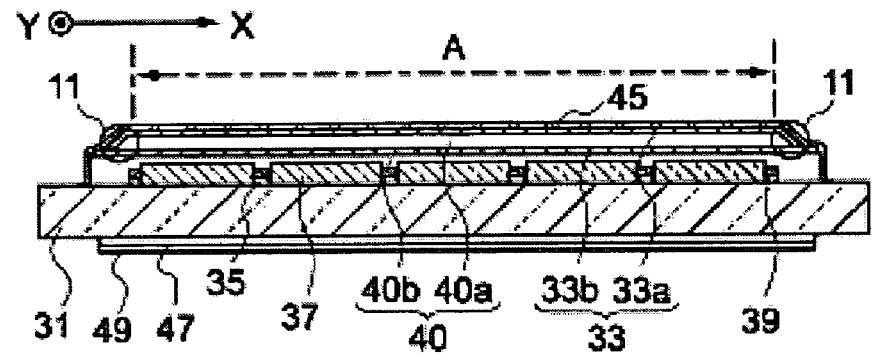

Further, as another example of the relieving portion, as shown in FIG. 10, a relieving portion 11 can have a plurality of step portions 12 which connect the thick layer portion 40a to the thin layer portion 40b. That is, in the case in which a difference in height between the thick layer portion and the thin layer portion is larger than the thickness of the electrode outboard of the display region, when the electrode is formed in the step portion therebetween, defects in formation may occur therein, which causes the electrode to be broken. Therefore, when a plurality of step portions is formed at the boundary between the thick layer portion and the thin layer portion outboard of the display region, it is possible to prevent the electrode from being broken by reducing a difference in height between the step portions.

For example, when the scanning electrode has a thickness of about 50 nm, it is preferable that the height of each of the plurality of step portions included in the relieving portion for reducing the step difference between the thick layer portion and the thin layer portion outboard of the display region be in a range of 30 to 60 nm.

Further, as shown in FIG. 11A, the relieving portion 11 is formed on one outer side of the display region A, for example, on one side of the display region which is electrically connected to the extending lines on the element substrate, so that the scanning line 33a on the thick layer portion 40a of the layer-thickness adjusting layer 40 is electrically connected to the scanning line 33b on the thin layer portion 40b thereof, which makes it possible to ensure the electrical connection therebetween. However, to more reliably ensure the electrical connection between the scanning electrodes 33a and 33b, it is preferable to form the relieving portions 11 at both sides of the display region A, as shown in FIG. 11B.

Figure 12A:
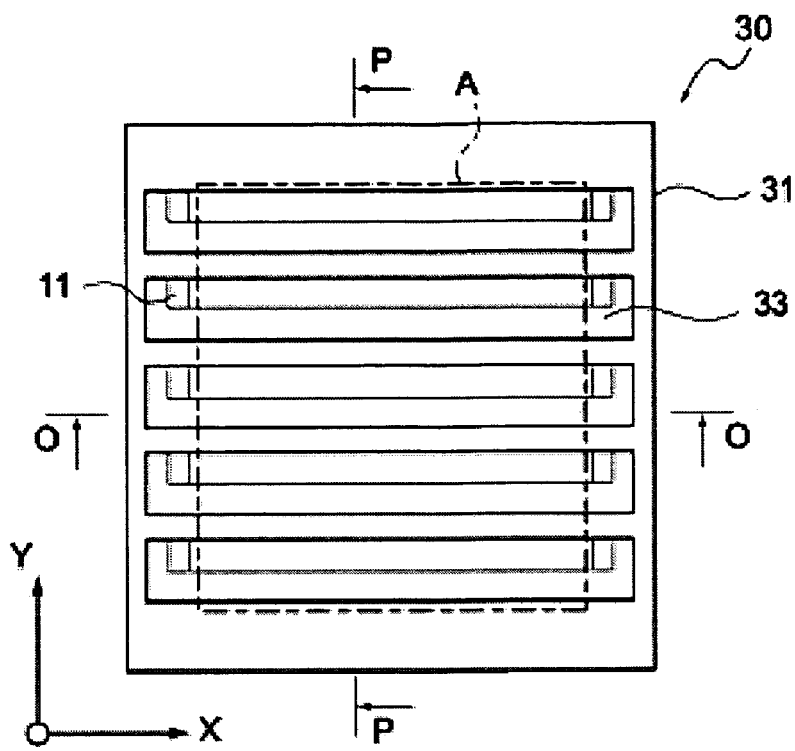
FIG. 12A is a plan view illustrating a color filter substrate in which a layer-thickness adjusting layer is provided in only the reflective regions.
Figure 12:
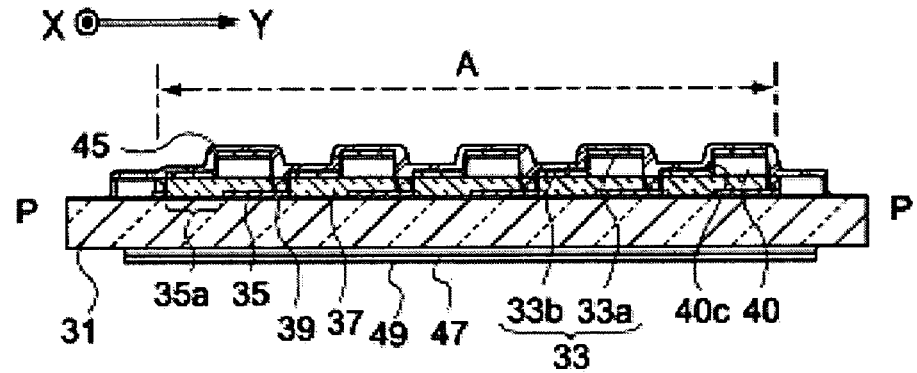
FIGS. 12B and 12C are cross-sectional views illustrating the color filter substrate in which the layer-thickness adjusting layer is provided in only the reflective regions.
Figure 12:
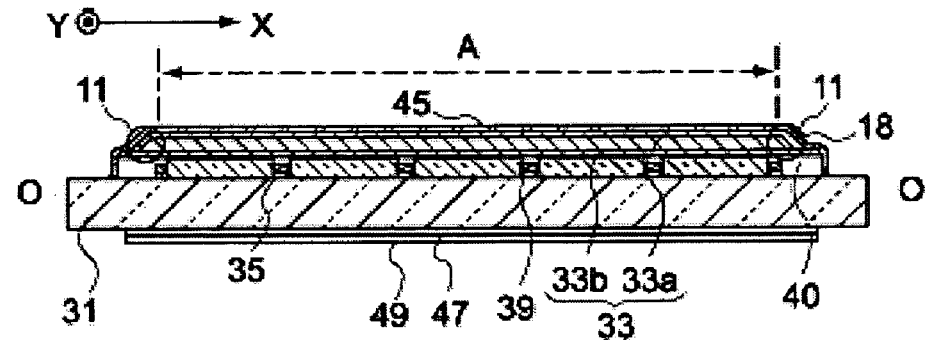
Figure 13:
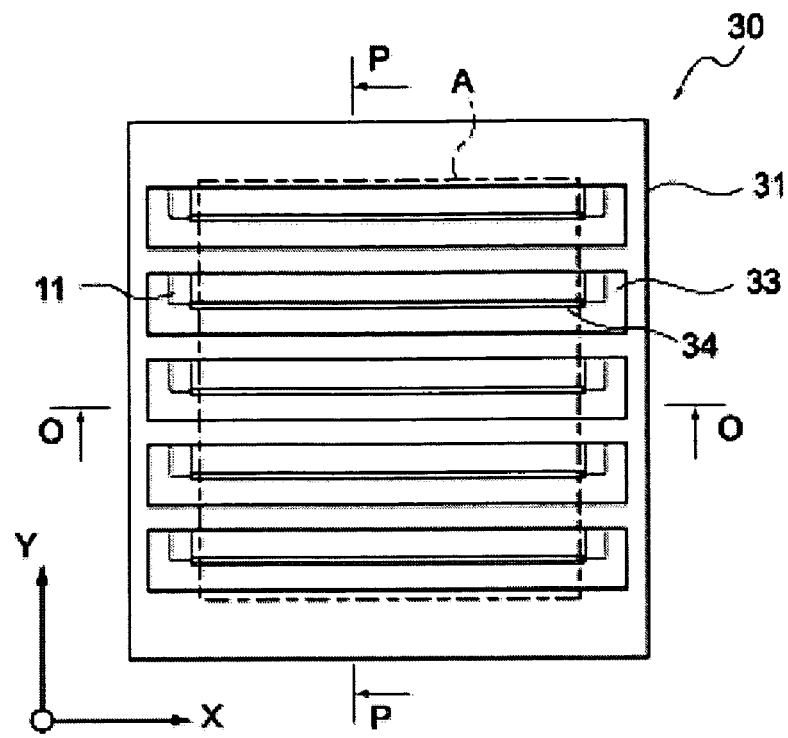
FIG. 13A is a plan view illustrating a color filter substrate in which slits are provided on electrodes.
FIGS. 13B and 13C are cross-sectional views illustrating the color filter substrate in which the slits are provided on the electrodes.
Figure 13:
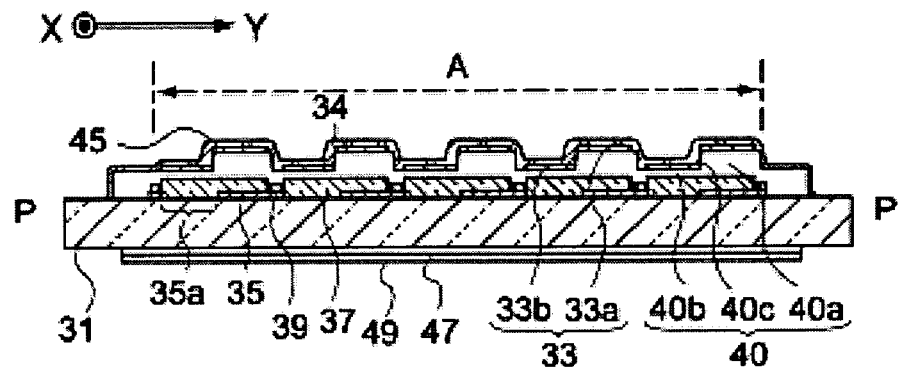
Figure 13:
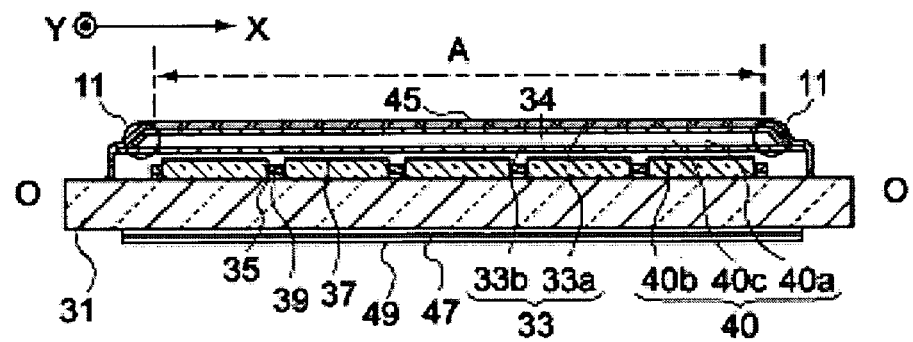
Figure 14:
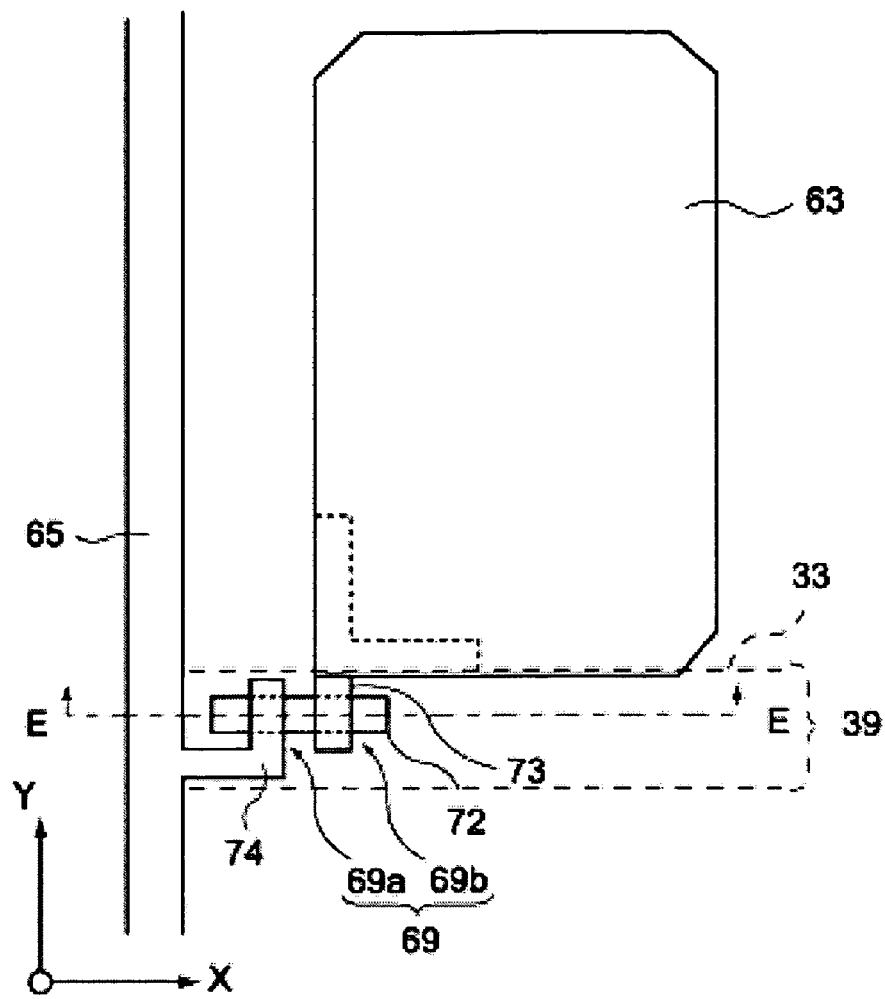
FIG. 14A is a plan view illustrating an element substrate.
FIG. 14B is a cross-sectional view illustrating the element substrate.
Figure 14:
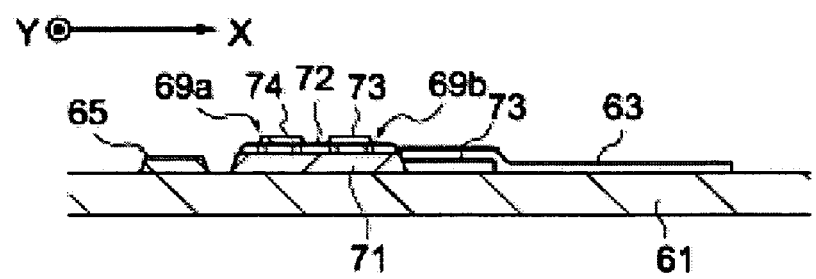

Furthermore, in order that the reflective region is formed to be thinner than the transmissive region in the liquid crystal material layer to optimize retardation, the thick layer portion corresponding to the reflective region and the thin layer portion corresponding to the transmissive region are formed, as described above. However, the invention is not limited to this structure, but the layer-thickness adjusting layer 40 can be formed so as to correspond to only the reflective regions R, as shown in FIGS. 12A to 12C. In this case, inclined planes are in the step portions corresponding to end portions of the layer-thickness adjusting layer 40, the inclined plane 40c is vertically formed in the display region A. The relieving portions 11 are provided outside the display region A, each relieving portion 11 has an inclined plane 18 which has a smaller angle of inclination than the inclined plane 40c of the display region A.

Moreover, the structure of the relieving portion is not limited to the above-mentioned aspect, but other structures can be used as long as the electrical connection between the scanning electrode on the thick layer portion and the scanning electrode on the thin layer portion can be ensured.

(6) Scanning Electrode

Further, the scanning electrodes 33 formed of a transparent conductive material, such as ITO (indium tin oxide), are formed on the layer-thickness adjusting layer 40. The scanning electrodes 33 are arranged in strip shapes so as to be parallel to pixel rows each composed of pixels arranged in a given direction.

In the liquid crystal display device of this embodiment, in the display region A, the inclined planes are formed in the vertical direction in the step portions between the thick layer portions 40a and the thin layer portions 40b of the layer-thickness adjusting layer 40 respectively corresponding to the reflective regions R and the transmissive regions T. Therefore, the scanning electrode 33a in the reflective region R and the scanning electrode 33b in the transmissive region T in one pixel may be discontinuously formed with each other.

However, the scanning electrodes formed in the reflective regions and the transmissive regions in the same pixel row are provided so as to extend outboard of the display region, and the scanning electrode in the reflective region and the scanning electrode in the transmissive region are connected to each other on the relieving portion for reducing the step difference between the thick layer portion and the thin layer portion. Therefore, even when the scanning electrodes are discontinuously arranged in one pixel, it is possible to ensure the electrical connection between the scanning electrodes.

Therefore, even when the scanning electrode is formed on the step portion including the inclined plane which is formed in the vertical direction in the display region, it is possible to prevent errors in operation due to the breaking of the electrode.

Further, the electrical connection is ensured between the scanning electrode in the reflective region and the scanning electrode in the transmissive region in one pixel outboard of the display region, and the electrical connection between the scanning electrode on the thick layer portion and the scanning electrode on the thin layer portion of the layer-thickness adjusting layer is ensured on one side of the display region, for example, on one side of the display region which is electrically connected to the extending lines on the element electrode, which makes it possible to ensure the electrical connection. However, to more reliably ensure the electrical connection between the scanning electrodes, it is preferable that the scanning electrodes on the thick layer portions and the scanning electrodes on the thin layer portions of the layer-thickness adjusting layer be electrically connected to each other at both sides of the display region.

Further, as shown in FIGS. 13A to 13C, it is preferable that a slit 34 be provided on a position of the scanning electrode 33 corresponding to a step portion (the first inclined plane 40c) between the thick layer portion 40a and the thin layer portion 40b of the layer-thickness adjusting layer 40 of each pixel in the display region A.

In this case, the scanning electrode is not formed on the inclined plane causing defects in display, which causes the inclined plane to serve as a non-electric field region. Therefore, the inclined plane does not transmit light, which makes it possible to prevent defects in display.

Furthermore, according to the liquid crystal display device of this embodiment, the electrical connection between the scanning electrode in the reflective region and the scanning electrode in the transmissive region in one pixel is ensured outboard of the display region. Therefore, even when the slits are provided, errors in operation do not occur.

(7) Alignment Film

Moreover, the alignment film 45 formed of, for example, polyimide resin is formed on all the scanning electrodes 33. For example, a rubbing process is performed on the alignment film to control the alignment of the liquid crystal material.

4. Element Substrate (1) Basic Structure

Further, as shown in FIGS. 14A and 14B, the element substrate 60 basically includes the base substrate 61 composed of, for example, a glass substrate, the data lines 65, the TFD elements 69, serving as switching elements, and the pixel electrodes 63. As shown in FIG. 2, an alignment film 75 formed of, for example, polyimide resin is formed on the pixel electrodes 63. In addition, a retardation plate (quarter-wave plate) 77 and a polarizing plate 79 are formed on the outer surface of the base substrate 61.

In addition, FIG. 14A is a plan view schematically illustrating the element substrate 60, and FIG. 14B is a cross-sectional view schematically illustrating the element substrate 60. A description of the alignment film or the polarizing plate will be appropriately omitted.

(2) Data Line and Extending Line

The data lines 65 are formed on the element substrate 60 in strip shapes in which a plurality of wiring lines are arranged parallel to each other. Although not shown, the extending lines electrically connected to the scanning electrodes 33 on the color filter substrate 30 through the sealing member containing conductive particles therein are provided on one side which extends in the vertical direction with respect to one side of a driver mounting region.

The data lines 65 and the extending lines are simultaneously formed with two-terminal non-linear elements, which will be described later, from the viewpoint of the simplicity of a manufacturing process and a reduction in electric resistance, and these lines are formed by laminating, for example, a tantalum layer, a tantalum oxide layer, and a chromium layer in this order.

(3) Pixel Electrode

Further, each pixel electrode 63 is electrically connected to the data line 65 through the switching element 69. The pixel electrodes 63 are arranged in a matrix between the data lines 65.

The pixel electrodes 63 can be formed of a transparent conductive material such as ITO (indium tin oxide) or IZO (indium zinc oxide).

(4) Switching Element

Furthermore, the TFD elements 69, serving as switching elements for electrically connecting the data lines 65 and the pixel electrodes 63, are formed on the element substrate 60. The TFD element 69 generally has a sandwich structure in which a first element electrode 71 made of, for example, a tantalum (Ta) alloy, an insulating film 72 made of a tantalum oxide ($Ta_2O_5$), and second electrode electrodes 73 and 74 made of chromium (Cr) are sequentially laminated. The TFD element 69 has a diode switching characteristic in the positive and negative directions, and is turned on when a voltage higher than a threshold value is applied between the first element electrode 71 and the second element electrodes 73 and 74.

Furthermore, two TFD elements 69a and 69b are preferably formed so as to be interposed between the data line 65 and the pixel electrode 63, and the first TFD element 69a preferably has a diode characteristic reverse to that of the second TFD element 69b.

In this way, it is possible to use a symmetric pulse waveform in polarity as a voltage to be applied, and to prevent the deterioration of the liquid crystal material in the liquid crystal display device. That is, to prevent the deterioration of the liquid crystal material, it is desirable that the diode switching characteristics in the positive and negative directions be symmetric, and it is possible to use a symmetric pulse waveform in the negative and positive directions by connecting the two TFD elements 69a and 69b in series such that their polarities are reverse to each other.

Second Embodiment

According to a second embodiment of the invention, a method of manufacturing the liquid crystal display device according to the first embodiment is provided. The method includes: forming a photosensitive resin material layer on the first substrate; forming, to adjust retardation of the reflective regions and the transmissive regions, a layer-thickness adjusting layer which includes thick layer portions that are arranged in the reflective regions; thin layer portions that are arranged in the transmissive regions; step portions that are formed, in the display region, at boundaries between the thick layer portions and the thin layer portions such that inclined planes thereof are formed in the vertical direction; and relieving portions that are formed outboard of the display region to reduce a step difference between the thick layer portions and the thin layer portions; and forming the first electrodes on the layer-thickness adjusting layer so as to be laid across the pixel rows and to extend outboard of the display region, so that the first electrodes formed in the reflective regions and the transmissive regions in the same pixel row are connected to each other on the relieving portions.

Figure 15:
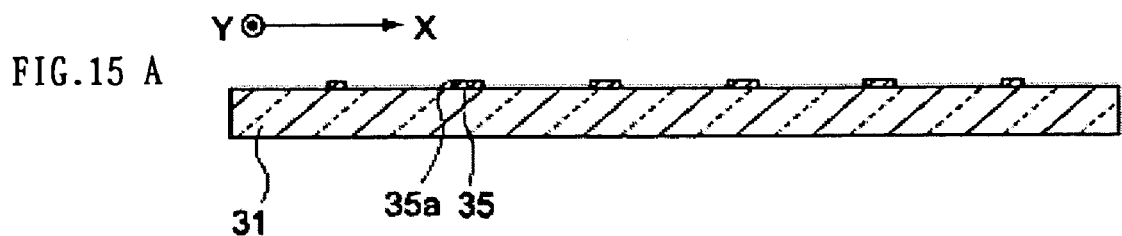
FIGS. 15A to 15D are cross-sectional views illustrating a manufacturing method of the color filter substrate used for the liquid crystal display device according to the first embodiment (part 1).
Figure 15:
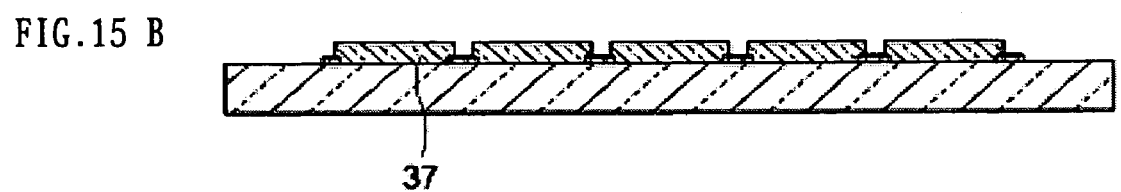
Figure 15:
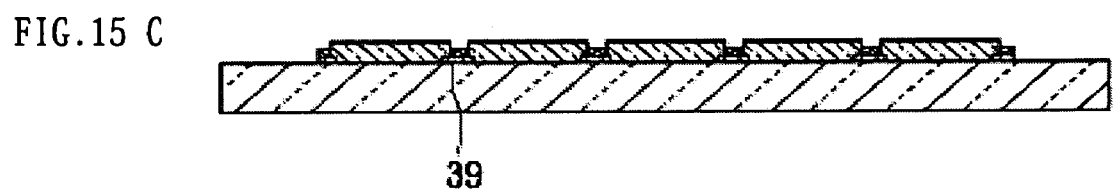
Figure 15:
Figure 16:
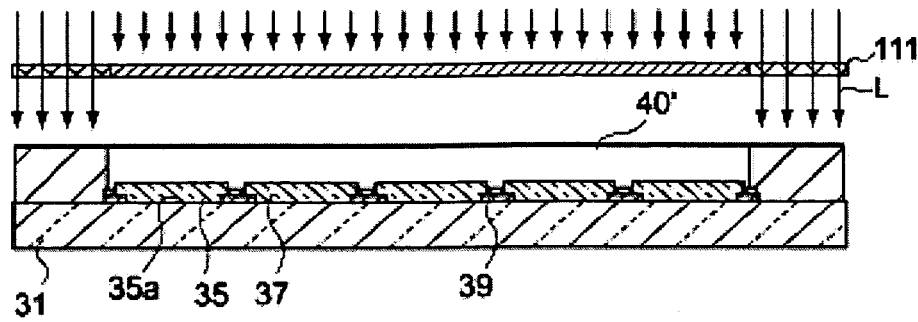
FIGS. 16A to 16E are diagrams illustrating the manufacturing method of the color filter substrate used for the liquid crystal display device according to the first embodiment (part 2).
Figure 16:
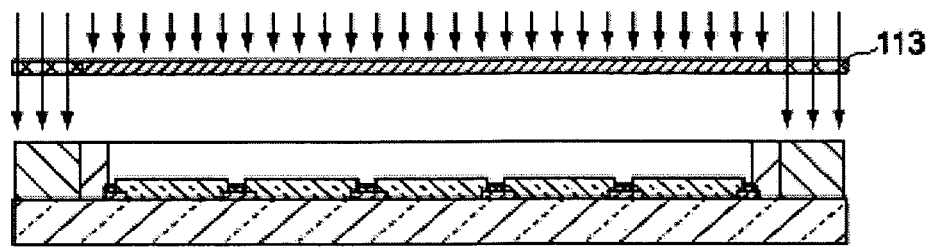
Figure 16:
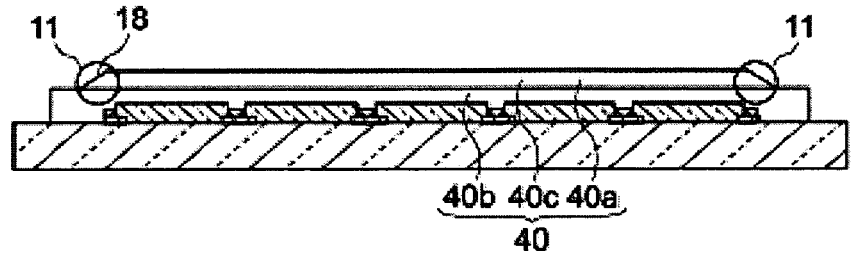
Figure 16:
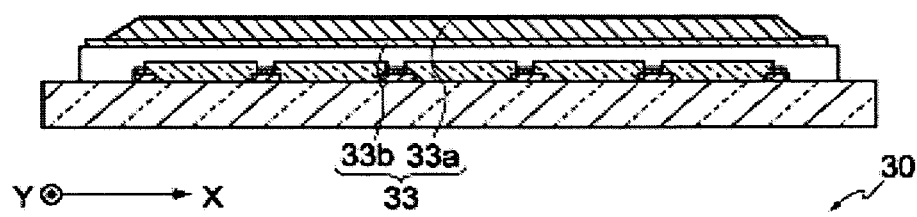
Figure 16:
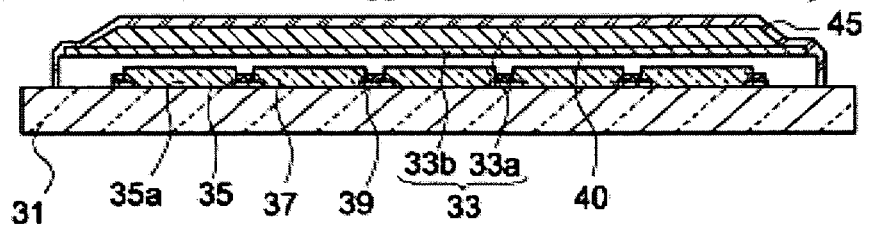
Figure 17:
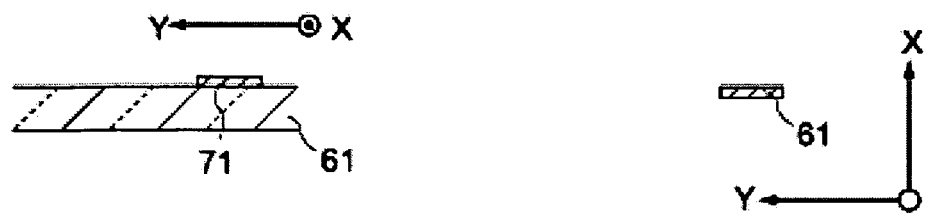
FIGS. 17A to 17E are diagrams illustrating a manufacturing method of the element substrate.
Figure 17:
Figure 17:
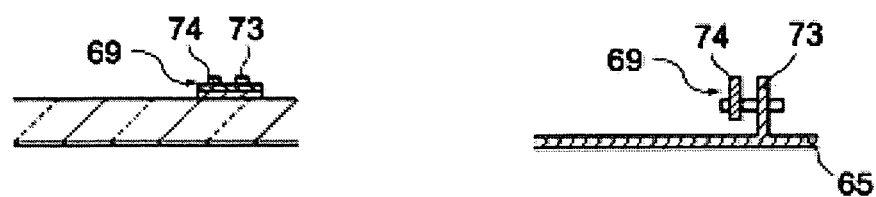
Figure 17:
Figure 17:
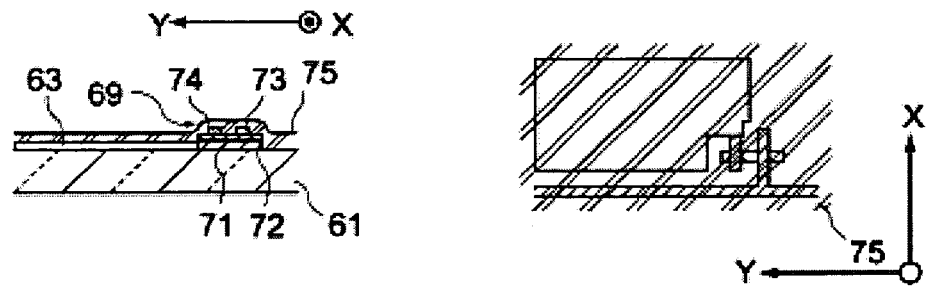

As an example of the manufacturing method of the liquid crystal display device according to the second embodiment, a method of manufacturing the liquid crystal display device according to the first embodiment will be described with reference to FIGS. 15 to 17.

1. Manufacturing Process of Color Filter Substrate (1) Formation of Reflective Film First, as shown in FIG. 15A, a reflective film 35 for forming the reflective regions is formed on a glass substrate 31 serving as a base of a first substrate. The reflective film can be formed by depositing a metallic material, such as aluminum, on a mother substrate by using an evaporation method or a sputtering method, and then by patterning it using a photolithography method.

Further, when a transflective color filter substrate is manufactured, the reflective film 35 having apertures 35a for forming the transmissive regions corresponding to the pixels is formed.

(2) Formation of Colored Layer

Next, as shown in FIG. 15B, R, G, and B colored layers 37 are formed corresponding to the pixels. The colored layers can be formed by applying photosensitive resin composed of transparent resin containing a coloring material, such as pigment or dye, dispersed therein on the mother substrate and by sequentially performing pattern exposure and developing processes on the photosensitive resin. In addition, the exposure and developing processes are repeatedly performed on the colors R, G, and B.

(3) Formation of Light Shielding Film

Then, as shown in FIG. 15C, the light shielding film 39 is formed in regions between the pixels. As the light shielding film, any of the following films can be used: a metal film made of, for example, chromium (Cr) or molybdenum (Mo); a film formed by dispersing three coloring materials of R (red), G (green), and B (blue) in a base member other than resin; and a film formed by dispersing a coloring material, such as a black pigment or dye, in a base member other than resin.

For example, when the light shielding film is formed by the metal film, the light shielding film can be formed by depositing a metallic material, such as chromium (Cr), on a glass substrate using an evaporation method, and then by etching it in a predetermined pattern.

(4) Formation of Layer-Thickness Adjusting Layer

Next, as shown in FIG. 15D, a photosensitive resin material layer 40' is formed by uniformly applying a photosensitive resin material on a substrate using a coating machine, such as a spin coater. In this case, for example, when the spin coater is used, the applying process is performed at a rotational speed of 600 to 2,000 rpm for 5 to 20 minutes to form a layer-thickness adjusting layer having a thickness of 1 to 10 μm.

The photosensitive resin material forming the layer-thickness adjusting layer is not limited to a specific material. For example, the layer-thickness adjusting layer may be formed of an acryl-based resin, an epoxy-based resin, a silicon-based resin, a phenol-based resin, an oxetane-based rein, or a combination thereof. In addition, inorganic fillers, such as silica particles, titanium oxide, zirconia oxide, and aluminum oxide, can be added into the photosensitive resin material to form an uneven pattern with high accuracy.

In addition, as the photosensitive resin material, any of the following materials can be used: a positive photosensitive resin material which is optically resolved by light passing through a transmissive portion and is then dissolved by a developing agent; and a negative photosensitive resin material which is hardened by light passing through the transmissive portion and is insoluble by the developing agent.

Further, in this embodiment, a positive photosensitive resin material is used.

Next, as shown in FIGS. 16A to 16C, in the layer-thickness adjusting layer 40 in which the thick layer portions 40a are arranged in the reflective regions and the thin layer portions 40b are arranged in the transmissive regions, each step portion whose inclined plane is vertically formed is provided at a boundary between the thick layer portion 40a and the thin layer portion 40b in the display region A, and the relieving portion 11 for reducing the step difference between the thick layer portion 40a and the thin layer portion 40b is formed at the boundary therebetween outboard of the display region.

More specifically, for example, a substrate is mounted on a stepper stage, and a first photo mask 111 is arranged thereon, as shown in FIG. 16A. Then, an energy beam represented by a letter 'L', such as an i beam, is radiated thereto to perform pattern exposure (first exposure) on the photosensitive resin material layer 40' on which the photosensitive resin material is uniformly coated.

Subsequently, the substrate is transferred from the stepper stage onto an exposure apparatus for full plate exposure, and a second photo mask 113 is arranged thereon, as shown in FIG. 16B. Then, similarly, the energy beam is radiated thereto to perform pattern exposure (second exposure) on the layer-thickness adjusting layer.

Then, for example, the photosensitive resin material layer 40' on the substrate 31 is developed by a developing agent, so that parts of the photosensitive resin material layer to which light passing through the transmissive portions of the first and second photo masks is radiated are developed. In this way, as shown in FIG. 16C, the layer-thickness adjusting layer 40 having the thick layer portions 40a corresponding to the reflective regions and the thin layer portions 40b corresponding to the transmissive portions 40b can be formed.

In this case, it is possible to form step portions having desired inclined planes outboard of the display region by making mask patterns of the first and second photo masks 111 and 113 different from each other. On the other hand, in the display region, the first exposure or the second exposure is performed, or the first and second photo masks 111 and 113 having the same mask pattern are used, which makes it possible to form the inclined planes in the vertical direction in the step portions without being tapered. Therefore, the layer-thickness adjusting layer 40 is formed as follows: in the display region A, the inclined planes (the first inclined planes 40c) are formed in the vertical direction in the step portions between the thick layer portions 40a and the thin layer portions 40b; on the other hand, outboard of the display region A, the inclined planes (the second inclined planes 18) are formed in the step portions between the thick layer portions 40a and the thin layer portions 40b so as to have an inclination angle smaller than the angle formed between the surface of the substrate and the first inclined plane 40c in the display region A.

Further, a method of forming the thick layer portions, the thin layer portions, and the inclines planes of the layer-thickness adjusting layer is performed by multiple exposure using a plurality of photo masks having different patterns. Alternatively, the layer-thickness adjusting layer having the thick layer portions, the thin layer portions, and the inclines planes may be formed by half-tone exposure using a half-tone mask having partially different transmittances.

(5) Formation of Scanning Electrode and Alignment Film

Next, as shown in FIG. 16D, a transparent conductive layer formed of a transparent conductive material, such as ITO (indium tin oxide), is formed on the entire surface of the layer-thickness adjusting layer having the thick layer portions and the thin layer portions therein by, for example, a sputtering method, and then patterning is performed thereon by using a photolithography method, thereby forming the electrodes 33 having a predetermined pattern.

For example, when the color filter substrate to be manufactured is a color filter substrate used for a passive matrix liquid crystal display device or an active matrix liquid crystal display device including TFD (thin film diode) elements, the transparent conductive layer is patterned into a plurality of transparent electrodes having strip shapes parallel to each other. In addition, when the color filter substrate to be manufactured is a color filter substrate used for an active matrix liquid crystal display device including TFT (thin film transistor) elements, the transparent conductive layer is patterned into plane-shaped transparent electrodes corresponding to cell regions.

In this case, since the step portions between the thick layer portions and the thin layer portions of the layer-thickness adjusting layer are formed in the vertical direction in the display region, defective scanning electrodes may be formed in the step portions. However, the relieving portions are formed in the layer-thickness adjusting layer outboard of the display region, and the scanning electrode in the reflective region and the scanning electrode in the transmissive region in one pixel are reliably connected to each other in the relieving portion, which makes it possible to ensure the electrical connection therebetween. Thus, it is possible to prevent errors in operation due to the breaking of the electrodes, and thus to manufacture a liquid crystal display device having a small area of a display defect region.

Next, as shown in FIG. 16E, the alignment film 45 formed of, for example, polyimide resin, is formed on the cell regions on the substrate having the transparent electrodes 33 formed thereon, thereby manufacturing the color filter substrate 30.

2. Manufacturing Process of Element Substrate (1) Formation of First Element Electrode As shown in FIG. 17A, in the manufacturing process of the element substrate 60, first, first element electrodes 71 are formed on the base substrate 61 composed of a glass substrate. The first element electrodes 71 can be formed of a metallic material, such as tantalum, and be formed by, for example, a sputtering method or an electron beam deposition method. In this case, to markedly improve the adhesion of the first element electrodes 71 to the second glass substrate 61, and to effectively prevent impurities from being diffused from the second glass substrate 61 to the first element electrodes 71, it is preferable to form an insulating film formed of, for example, tantalum oxide ($Ta_2O_5$), on the substrate 61 before forming the first element electrodes 71.

In this case, to cause the first element electrode to be commonly used by the TFD elements corresponding to two pixel electrodes which are adjacent to each other along the data line or which are adjacent to each other in the oblique direction along the data line, the first element electrode is preferably formed so as to be laid across two adjacent pixels. In this way, it is possible to decrease the formation area of the TFD element and to increase the size of the pixel electrode. As a result, it is possible to effectively manufacture a liquid crystal display device in which the area of each pixel increases and display characteristics, such as contrast, are improved.

Next, as shown in FIG. 17B, the surface of the first element electrode 71 is oxidized by an anodizing method to form an oxide film 72. More specifically, the substrate having the first element electrodes 71 formed thereon is dipped into an electrolytic solution, such as a citric acid solution, and then a predetermined voltage is applied between the electrolytic solution and the first element electrode 71 to oxidize the surface of the first element electrode 71.

(2) Formation of Second Element Electrode and Data Line

Next, a metal film is formed on the entire surface of the substrate having the first element electrodes 71 formed thereon by, for example, the sputtering method, and the metal film is patterned by the photolithography method, thereby forming the second element electrodes 73 and 74 and the data lines 65, as shown in FIG. 17C. In this way, it is possible to form the TFD elements 69 and the data lines 65.

(3) Formation of Pixel Electrode

Next, as shown in FIG. 17D, a transparent conductive layer made of a transparent conductive material, such as ITO (indium tin oxide), is formed by, for example, the sputtering method, and is then patterned by, for example, the photolithography method to form pixel electrodes 63 electrically connected to the TFD elements 69.

(4) Formation of Alignment Film

Subsequently, as shown in FIG. 17E, an alignment film 75 made of, for example, polyimide resin is formed on the element substrate 60 having the pixel electrodes 63, etc., formed thereon. In this way, the element substrate 60 can be manufactured.

3. Bonding Process

Next, although not shown, the sealing member 23 is laminated on the color filter substrate 30 or the element substrate 60 so as to surround the display region, and the other substrate is bonded thereto by hot-pressing. In this way, the color filter substrate 30 and the element substrate 60 are bonded to each other, thereby forming a cell structure.

4. Other Processes Including Assembling Process

Next, a liquid crystal material is injected into the cell through an inlet provided in the sealing member, and the inlet is sealed with, for example, a sealing material.

Further, retardation plates (quarter-wave plates) and polarizing plates are respectively provided on the color filter substrate 30 and the element substrate 60, and a driver is mounted. Then, the liquid crystal display device and a backlight are encased in a case, thereby manufacturing a liquid crystal display device.

Third Embodiment

According to a third embodiment of the invention, a transflective liquid crystal display device includes a first substrate having first electrodes formed thereon, a second substrate having second electrodes formed thereon, a liquid crystal material interposed between the first substrate and the second substrate, and a display region including a plurality of pixels each having a reflective region and a transmissive region therein. The reflective regions and the transmissive regions are arranged in strip shapes so as to be laid across pixel rows each composed of pixels arranged in a given direction in the display region. The first substrate includes a layer-thickness adjusting layer to adjust retardation in the reflective regions and the transmissive regions. The layer-thickness adjusting layer includes thick layer portions that are arranged in the reflective regions; thin layer portions that are arranged in the transmissive regions; and step portions that are formed, in the display region, at boundaries between the thick layer portions and the thin layer portions such that inclined planes thereof are formed in the vertical direction. The first electrodes are formed on the layer-thickness adjusting layer so as to be laid across the pixel rows, and extend outboard of the display region, and a conductive material is arranged so as to be laid across portions of the first electrodes extending outboard of the display region, the first electrodes being formed in the reflective regions and the transmissive regions in the same pixel row.

Hereinafter, a liquid crystal display device according to the third embodiment of the invention will be described with reference to FIG. 18 and FIGS. 19A to 19E, centered on the structure of a color filter substrate which is different from that of the liquid crystal display device according to the first embodiment. In addition, in this embodiment, a description of the same components as those in the first embodiment will be appropriately omitted.

1. Color Filter Substrate (1) Basic Structure

Figure 18:
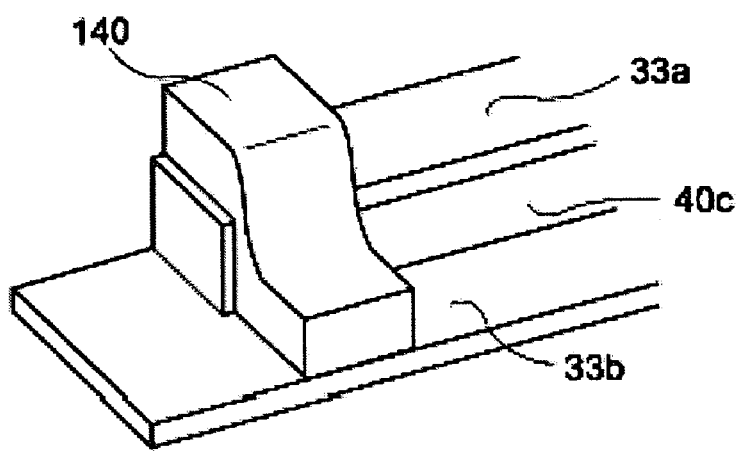
FIG. 18 is a diagram illustrating a conductive material of a color filter substrate used for a liquid crystal display device according to a third embodiment.
Figure 18:
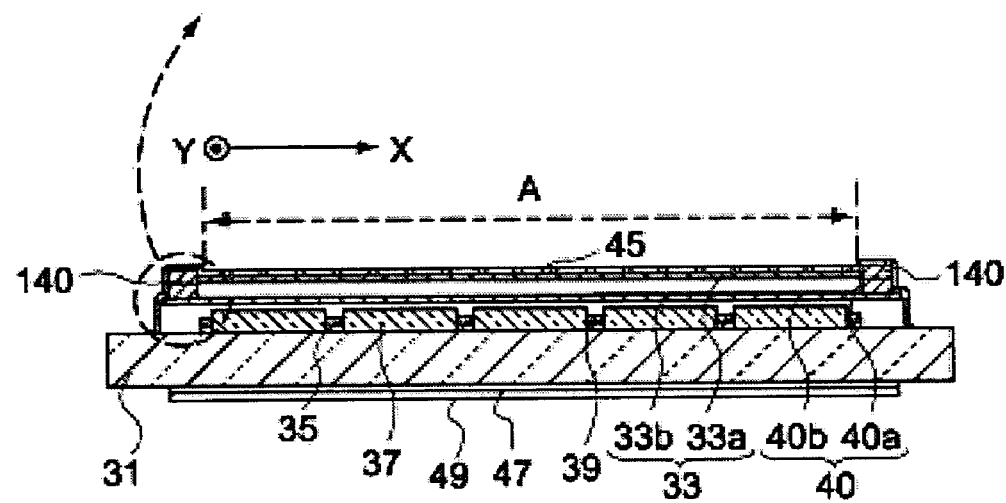

As shown in FIG. 18, the structure of a color filter substrate 30 used for a liquid crystal display device 10 according to this embodiment is basically the same as that of the color filter substrate according to the first embodiment. That is, the color filter substrate 30 is constituted by sequentially laminating a reflective film 35, a light shielding film 39, a colored layer 37, a layer-thickness adjusting layer 40, and scanning electrodes 33 on a base substrate 31 composed of, for example, a glass substrate. In addition, an alignment film 45 for controlling the alignment of a liquid crystal material is formed on the scanning electrodes 33, and a retardation plate (quarter-wave plate) 47 and a polarizing plate 49 are provided on a surface of the base substrate opposite to the surface having the scanning electrodes 33, etc., formed thereon to improve the definition of an image.

Further, since the reflective film 35, the light shielding film 39, the colored layer 37, and the alignment film 45 are the same as those of the color filter substrate used for the liquid crystal display device according to the first embodiment, a description thereof will be omitted.

(2) Layer-Thickness Adjusting Layer

Furthermore, in the liquid crystal display device 10 of this embodiment, the layer-thickness adjusting layer 40 formed of, for example, a photosensitive resin material, such as acrylic resin or epoxy resin, is formed on the color filter substrate 30. The layer-thickness adjusting layer 40 includes thick layer portions 40a arranged in the reflective regions and thin layer portions 40b arranged in the transmissive regions. In a display region A, each inclined plane 40c is formed in the vertical direction in a step portion between the thick layer portion 40a and the thin layer portion 40b.

That is, in a liquid crystal display device having a multi-gap structure in which the reflective region of the liquid crystal material layer has a thickness smaller than the transmissive region, to optimize retardation in the reflective region and the transmissive region, the layer-thickness adjusting layer is formed such that the width of the step portion between the thick layer portion and the thin layer portion is small in the display region, as viewed in a direction perpendicular to the surface of the substrate.

Therefore, as described in the first embodiment, it is possible to reduce the area of a display defect region due to the step difference, and thus to optimize retardation in both the reflective region and the transmissive region, which makes it possible to achieve a liquid crystal display device having good display characteristics.

However, in the case in which the inclined plane is formed in the vertical direction in the step portion between the thick layer portion and the thin layer portion, in a manufacturing process, when the scanning electrodes are formed on the layer-thickness adjusting layer, the electrodes may be non-uniformly formed in the step portions. In this case, poor electrical connection occurs between the scanning electrode in the reflective region and the scanning electrode in the transmissive region of each pixel, which causes errors in operation.

Therefore, in the liquid crystal display device of this embodiment, as will be described later, unlike the relieving portions of the first embodiment, the electrical connection between the scanning electrode in the reflective region and the scanning electrode in the transmissive region in one pixel is ensured outboard of the display region by using a conductive material.

(3) Scanning Electrode and Conductive Material

Further, the scanning electrodes 33 formed of a transparent conductive material, such as ITO (indium tin oxide), are formed on the layer-thickness adjusting layer 40. The scanning electrodes 33 are arranged in strip shapes so as to be parallel to pixel rows each composed of pixels arranged in a given direction.

In the liquid crystal display device of this embodiment, in the display region, the inclined planes are formed in the vertical direction in the step portions between the thick layer portions 40a and the thin layer portions of the layer-thickness adjusting layer 40 respectively corresponding to the reflective regions and the transmissive regions. Therefore, the scanning electrode in the reflective region and the scanning electrode in the transmissive region in one pixel may not be continuously formed.

In the liquid crystal display device of this embodiment, the scanning electrode 33a on the thick layer portion 40a and the scanning electrode 33b on the thin layer portion 40b in one pixel extend outboard of the display region A. In addition, the scanning electrodes 33, each formed on the reflective regions and the transmissive regions of the same pixel row, are electrically connected to each other by a conductive material 140 arranged so as to be laid across portions of the scanning electrodes 33 extending outboard of the display region A. Therefore, even when the scanning electrode 33a in the reflective region and the scanning electrode 33b in the transmissive region in one pixel are not continuously formed with each other, it is possible to ensure the electrical connection therebetween, and to apply a voltage to both the reflective region and the transmissive region in one pixel.

Therefore, in the layer-thickness adjusting layer in the display region, it is possible to prevent the occurrence of errors in operation due to the breaking of the electrodes, regardless of whether the scanning electrodes are formed on the step portions including the inclined planes formed in the vertical direction.

As an example of the conductive material, the conductive material 140 having a thickness larger than the step difference between the thick layer portion 40a the thin layer portion 40b can be used, as shown in FIG. 18. That is, the conductive material 140 is arranged or formed so as to be laid across portions of the scanning electrodes 33a and 33b respectively formed on the thick layer portion 40a and the thin layer portion 40b of the layer-thickness adjusting layer 40 which extend outboard of the display region. This structure makes it possible to ensure the electrical connection between the scanning electrode 33a on the thick layer portion 40a and the scanning electrode 33b on the thin layer portion 40b, without considering the breaking of the electrodes and defects in formation in the step portions.

The conductive material includes, for example, Al (aluminum), Ta (tantalum), Cr (chromium), Ag (silver), ITO (indium tin oxide), and IZO (indium zinc oxide). However, the conductive material is not limited thereto, but any material may be used as long as it can be formed or arranged on the substrate with a thickness not affecting the cell gap of a liquid crystal panel.

In addition, the other structures in which both ends of the scanning electrodes are electrically connected to each other at both sides of the display region and slits are provided at positions corresponding to the step portions (first inclined planes) between the thick layer portions and the thin layer portions are the same as those in the first embodiment.

Fourth Embodiment

According to a fourth embodiment of the invention, there is provided a method of manufacturing the liquid crystal display device according to the third embodiment. The manufacturing method includes: forming a photosensitive resin material layer on the first substrate; forming, to adjust retardation of the reflective regions and the transmissive regions, a layer-thickness adjusting layer which includes thick layer portions that are arranged in the reflective regions; thin layer portions that are arranged in the transmissive regions; and step portions that are formed, in the display region, at boundaries between the thick layer portions and the thin layer portions such that inclined planes thereof are formed in the vertical direction; forming the first electrodes on the layer-thickness adjusting layer so as to be laid across the pixel rows and to extend outboard of the display region; and arranging a conductive material so as to be laid across portions of the first electrodes extending outboard of the display region, the first electrodes being formed in the reflective regions and the transmissive regions in the same pixel row.

Hereinafter, the manufacturing method of the liquid crystal display device according to the fourth embodiment of the invention will be described with reference to FIGS. 19A to 19E, centered on a manufacturing method of a color filter substrate which is different from that of the second embodiment. In addition, in this embodiment, a description of the same components and manufacturing processes as those in the second embodiment will be appropriately omitted.

1. Manufacturing Process of Color Filter Substrate (1) Formation of Reflective Film, Colored Layer, and Light Shielding Film As shown in FIG. 19A, first, a reflective film 35, a colored film 37, and a light shielding film 39 are formed on a glass substrate 31 by the same method as that in the second embodiment.

(2) Formation of Layer-Thickness Adjusting Layer

Figure 19:
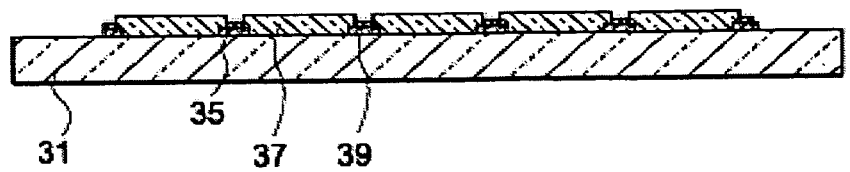
FIGS. 19A to 19E are cross-sectional views illustrating a manufacturing method of the color filter substrate used for the liquid crystal display device according to the third embodiment.
Figure 19:
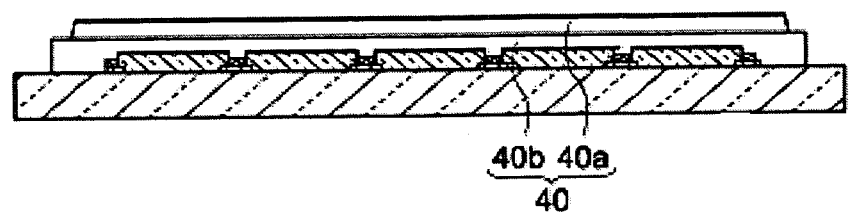
Figure 19:
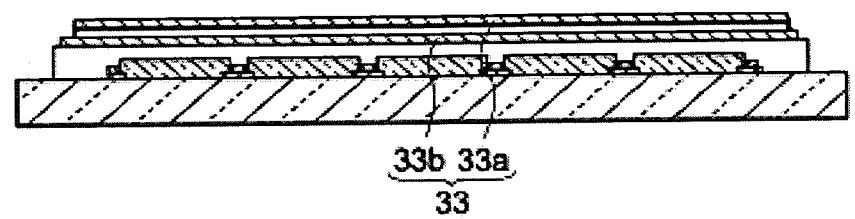
Figure 19:
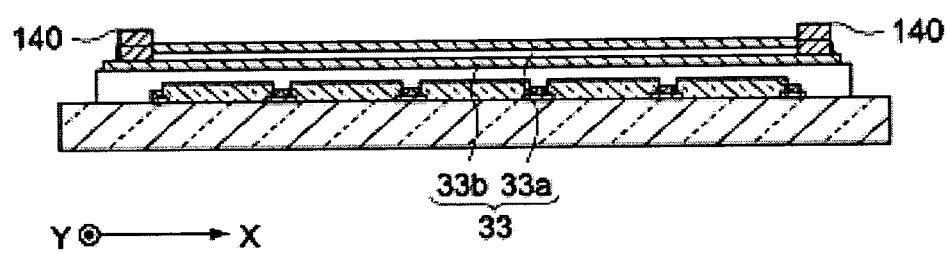
Figure 19:
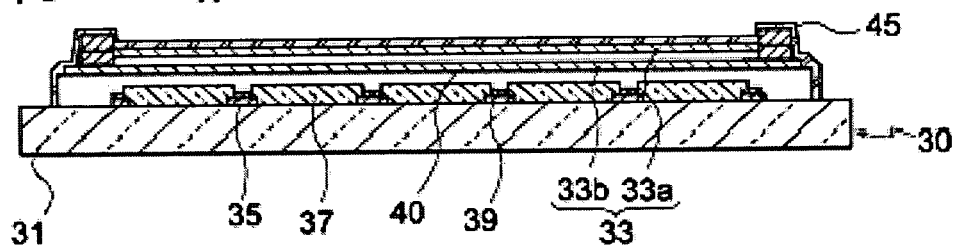

Next, as shown in FIG. 19B, patterning is performed by multiple exposure using a plurality of photo masks having different patterns or by half-tone exposure using a half-tone mask having partially different transmittances, similar to the second embodiment, and then a developing process is performed by using a developing agent to form a layer-thickness adjusting layer 40 including thick layer portions 40a and thin layer portions 40b respectively corresponding to reflective regions and transmissive regions.

According to this process, since inclined planes in step portions between the thick layer portions and the thin layer portions are formed in the vertical direction, it is possible to decrease the width of the step portion, as viewed in a direction perpendicular to the surface of the substrate, and thus to reduce the area of a display defect region. Therefore, it is possible to improve display characteristics, such as contrast, of the manufactured liquid crystal display device.

(3) Formation of Scanning Electrode and Conductive Material

Next, as shown in FIG. 19C, scanning electrodes 33 are formed on the thick layer portions 40a and the thin layer portions 40b of the layer-thickness adjusting layer 40, similar to the second embodiment.

Then, as shown in FIG. 19D, a conductive material 140 is arranged outboard of the display region A for electrically connecting scanning electrodes 33a on the thick layer portions 40a to scanning electrodes 33b on the thin layer portions 40b. For example, when an aluminum film is used as the conductive material, the aluminum film can be formed by the same method as that used for forming the reflective film.

2. Other Processes

The other processes, such as an element substrate manufacturing process, a bonding process, and a liquid crystal injecting process, are the same as those in the second embodiment, and thus a description thereof will be omitted.

Fifth Embodiment

According to a fifth embodiment, the transflective liquid crystal display device of the first embodiment is applied to an active matrix liquid crystal display device using TFT (thin film transistor) elements, which are three-terminal active elements, as switching elements.

Figure 20:
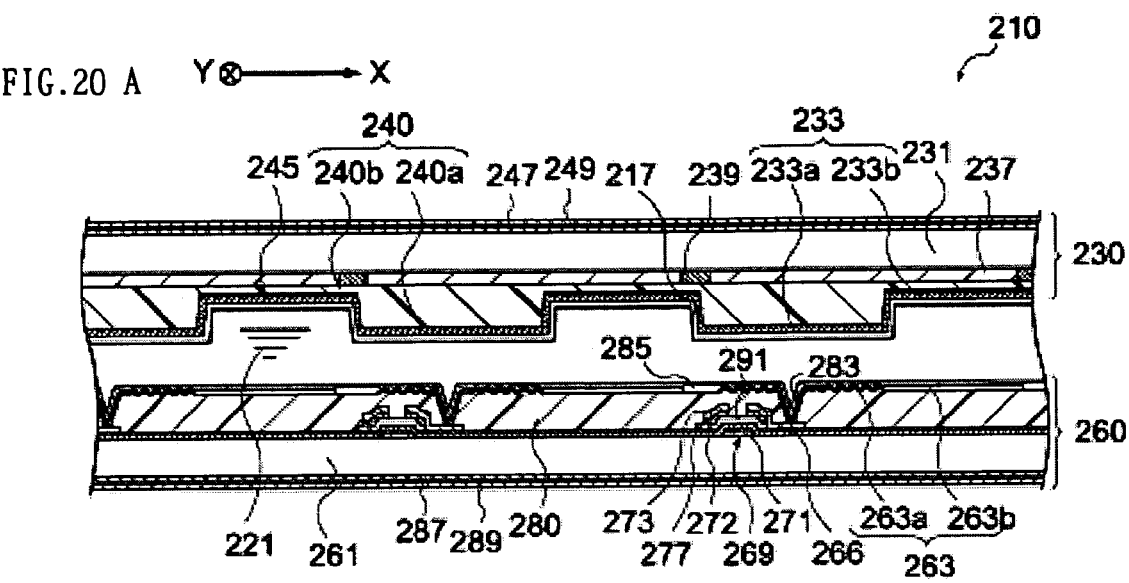
FIG. 20A is a cross-sectional view illustrating a liquid crystal display device according to a fifth embodiment.
FIG. 20B is a plan view illustrating the liquid crystal display device according to the fifth embodiment.
Figure 20:
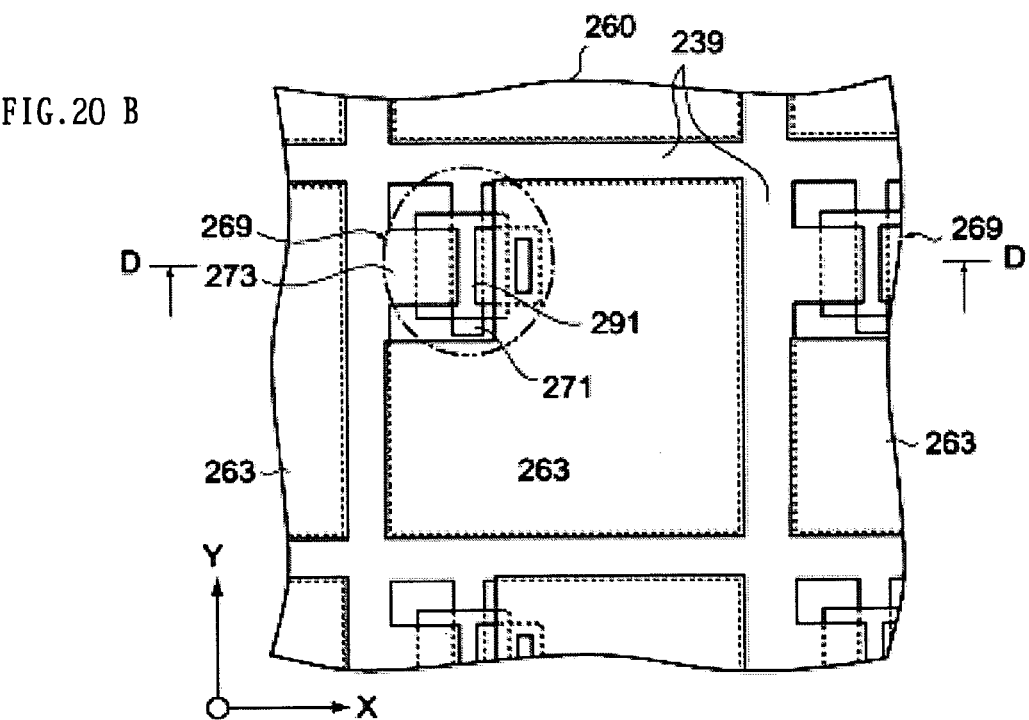

FIG. 20A is a cross-sectional view of a liquid crystal display device 210 according to the fifth embodiment, and FIG. 20B is a plan view of the liquid crystal display device 210. As shown in FIG. 20A, the liquid crystal display device 210 is formed by bonding a counter substrate 230 to an element substrate 260 with a sealing member interposed between the peripheral portions thereof, and by injecting a liquid crystal material 221 into a gap surrounded by the counter substrate 230, the element substrate 260, and the sealing member.

Further, the counter substrate 230 is formed of, for example, glass or plastic, and includes a colored layer 237, serving as a color filter layer, counter electrodes 233 formed on the colored layer 237, and an alignment film 245 formed on the counter electrodes 233. In addition, a layer-thickness adjusting layer 240 for optimizing retardation is provided between the counter electrode 233 and the colored layer 237 in each reflective region R.

The counter electrodes 233 are plane-shaped electrodes formed of, for example, ITO on the entire surface of the counter substrate 230. In addition, the colored layer 237 has R (red), G (green), and B (blue) or C (cyan), M (magenta), and Y (yellow) filter elements formed at positions corresponding to pixel electrodes 263 on the element substrate 260. Further, a black mask or a black matrix, that is, a light shielding film 239 is provided at positions which are adjacent to the colored layer 237 and are not opposite to the pixel electrodes 263.

Furthermore, the element substrate 260 opposite to the counter substrate 230 is formed of, for example, glass or plastic, and includes TFT elements 269, which are active elements serving as switching elements, and the pixel electrodes 263 formed on the TFT elements 269 with a transparent insulating film 280 interposed therebetween.

The pixel electrode 263 serves as a reflective film 295 (263a) for performing reflective display in the reflective region R and serves as a transparent electrode 263b made of, for example, ITO in the transmissive region T. In addition, the reflective film 295, serving as the pixel electrode 263a, is formed of a reflective material such as Al (aluminum) or Ag (silver). Further, an alignment film 285 is formed on the pixel electrodes 263, and an alignment treatment, such as a rubbing treatment, is performed on the alignment film 285.

Moreover, a retardation plate 247 is formed on an outer surface of the counter substrate 230 (that is, the upper side of FIG. 20A), and a polarizing plate 249 is formed thereon. Similarly, a retardation plate 287 is formed on an outer surface of the element substrate 260 (that is, the lower side of FIG. 20A), and a polarizing plate 289 is formed thereon. In addition, a backlight unit (not shown) is arranged on the lower side of the element substrate 260.

Further, each TFT element 269 includes a gate electrode 271 formed on the element substrate 260, a gate insulating firm 272 formed on the gate electrode 271 in the entire region of the element substrate 260, a semiconductor layer 291 formed on the gate electrode 271 with the gate insulating film 272 interposed therebetween, a source electrode 273 formed on one side of the semiconductor layer 291 through a contact electrode 277, and a drain electrode 266 formed on the other side of the semiconductor layer 291 through the contact electrode 277.

The gate electrode 271 extends from a gate bus line (not shown), and the source electrode 273 extends from a source bus line (not shown). In addition, a plurality of gate bus lines are formed parallel to each other in the horizontal direction of the element substrate 260 at regular intervals in the vertical direction thereof, and a plurality of source bus lines are formed parallel to each other in the vertical direction of the element substrate 260 at regular intervals in the horizontal direction thereof so as to intersect the gate bus lines with the gate insulating film 272 interposed therebetween.

The gate bus lines are connected to a liquid crystal driving IC (not shown) to serve as, for example, scanning lines, and the source bus lines are connected to another driving IC (not shown) to serve as, for example, signal lines.

Further, each pixel electrode 263 is formed in a region other than a portion of a square region partitioned by the gate bus line and the source bus line intersecting with each other which corresponds to the TFT element 269.

The gate bus lines and the gate electrodes can be formed of, for example, chromium or tantalum. In addition, the gate insulating film 272 is formed of, for example, a silicon nitride (SiNx) or a silicon oxide (SiOx). The semiconductor layer 291 can be formed of, for example, doped a-Si, polycrystalline silicon, or CdSe. Further, the contact electrode 277 can be formed of, for example, a-Si, and the source electrode 273, the source bus line integrally formed with the source electrode, and the drain electrode 266 can be formed of, for example, titanium, molybdenum, or aluminum.

Furthermore, an organic insulating film 280 is formed on the entire surface of the element substrate 260 so as to cover the gate bus lines, the source bus lines, and the TFT elements 269. However, each contact hole 283 is formed in a portion of the organic insulating film 280 corresponding to the drain electrode 266, and the pixel electrode 263 and the drain electrode 266 of the TFT element 269 are electrically connected to each other through the contact hole 283.

Moreover, the organic insulating film 280 having an uneven pattern composed of the arrangement of regular or irregular convex and concave portions is formed as a scattering shape in regions corresponding to the reflective regions R. As a result, the reflective film 295 (263a) formed on the organic insulating film 280 has a reflective pattern composed of convex and concave portions in the same manner as described above. However, the uneven pattern is not formed in the transmissive regions T.

In the liquid crystal display device 210 having the above-mentioned structure, when reflective display is performed, external light, such as sunlight or illumination light, is incident on the counter substrate 230 of the liquid crystal display device 210, and passes through the colored layer 237 and a liquid crystal material 221 to reach the reflective film 295. Then, the light is reflected therefrom to pass through the liquid crystal material 221 and the colored layer 237 again, and is then emitted from the liquid crystal display device 210 to the outside, thereby performing reflective display.

On the other hand, when transmissive display is performed, a backlight unit (not shown) is turned on to emit light. Then, the light emitted from the backlight unit sequentially passes through the transparent electrode 263b, the colored layer 237, and the liquid crystal material 221 to be emitted from a liquid crystal panel 220 to the outside, thereby performing transmissive display.

Further, in the liquid crystal display device of this embodiment, the reflective regions and the transmissive regions are arranged in strip shapes in the display region so as to be laid across pixel rows each composed of pixels arranged in a given direction. As shown in FIG. 20A, the counter substrate 230 is provided with the layer-thickness adjusting layer 240 including thick layer portions 240a arranged in the reflective regions and thin layer portions 240b arranged in the transmissive regions, to adjust the retardation of the reflective regions and the transmissive regions.

In the display region, the layer-thickness adjusting layer 240 includes step portions in which inclined planes 217 formed at boundaries between the thick layer portions 240a and the thin layer portions 240b are formed in the vertical direction. In this way, it is possible to decrease the width of the step portion as viewed in a direction perpendicular to the surface of the substrate and to reduce the area of a display defect region.

Figure 21:
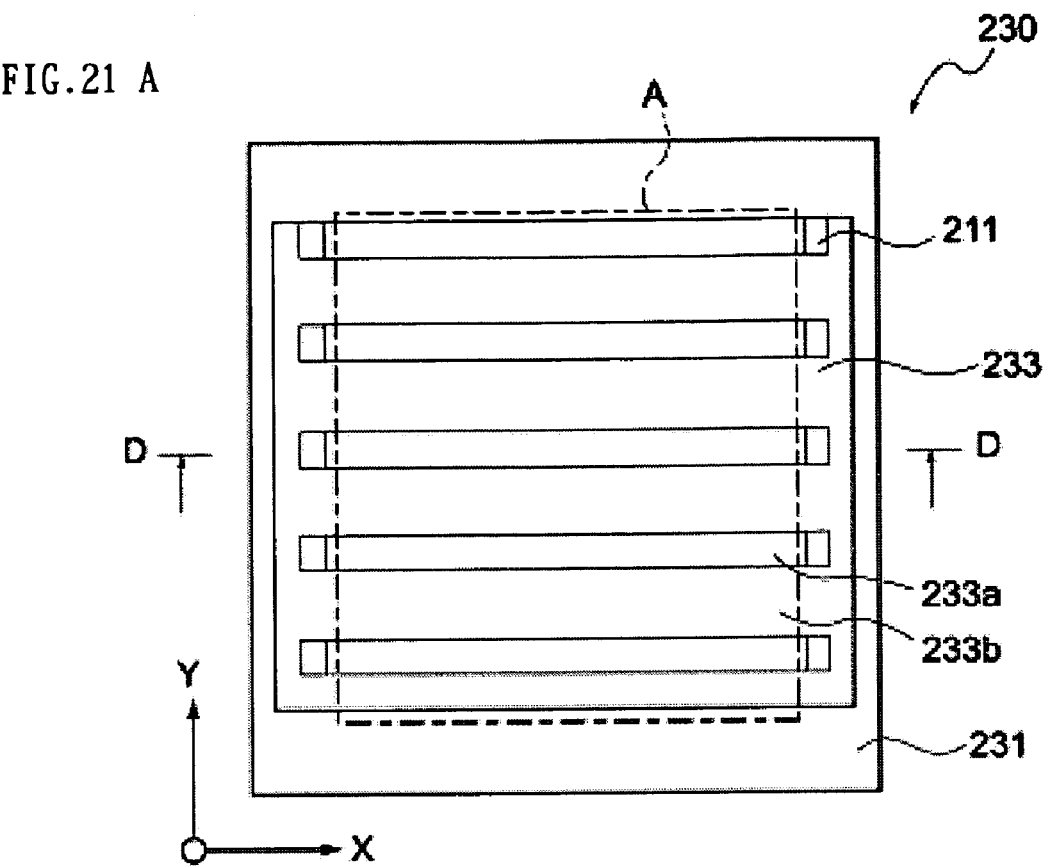
FIG. 21A is a plan view illustrating a counter substrate used for the liquid crystal display device according to the fifth embodiment.
FIG. 21B is a cross-sectional view illustrating the counter substrate used for the liquid crystal display device according to the fifth embodiment.
Figure 21:
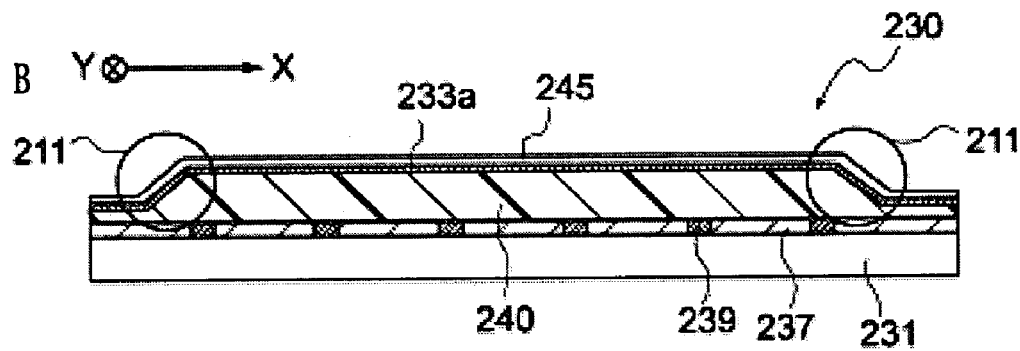

Further, as shown in FIGS. 21A and 21B, the layer-thickness adjusting layer 240 includes relieving portions 211 for reducing the step difference between the thick layer portion and the thin layer portion outboard of the display region, and an electrode 233a on the thick layer portion and an electrode 233b on the thin layer portion are electrically connected to each other on each relieving portion 211. Therefore, electrical connection is ensured between the electrodes. Alternately, the electrodes on the thick layer portions and the electrodes on the thin layer portions extend outboard of the display region, and a conductive material is arranged so as to be laid across these electrodes, thereby securing the electrical connection therebetween. Therefore, in the display region, even when a steep step portion is formed at the boundary between the thick layer portion and thin layer portion and thus defective electrodes may be formed in the step portion, the electrical connection between the electrodes can be ensured outboard of the display region, which makes it possible to prevent errors in operation due to the breaking of the electrodes.

Thus, it is possible to decrease the area of a display defect region and to optimize retardation, which makes it possible to achieve a liquid crystal display device having good display characteristics.

FIG. 21A is a plan view of the counter substrate having the above-mentioned structure, and FIG. 21B is a cross-sectional view of the counter substrate. In the counter substrate 230 of the liquid crystal display device according to this embodiment, plane-shaped electrodes 233 are provided on the layer-thickness adjusting layer 240, so that defects in formation, such as breaking of electrodes, may occur in the step portions between the thick layer portions and the thin layer portions of the layer-thickness adjusting layer 240 in the display region. However, the electrical connection between all plane-shaped electrodes 233 is ensured outboard of the display region by the relieving portions 211 or the conductive material, and thus it is possible to prevent errors in operation due to the breaking of the electrodes and to reduce the area of a display defect region caused by the step difference between the thick layer portion and the thin layer portion.

Therefore, it is possible to improve display characteristics of a liquid crystal display device having TFT elements.

Sixth Embodiment

According to a sixth embodiment, an electronic apparatus having the liquid crystal display device according to any one of the first, third, and fifth embodiments will be described in detail.

Figure 22:
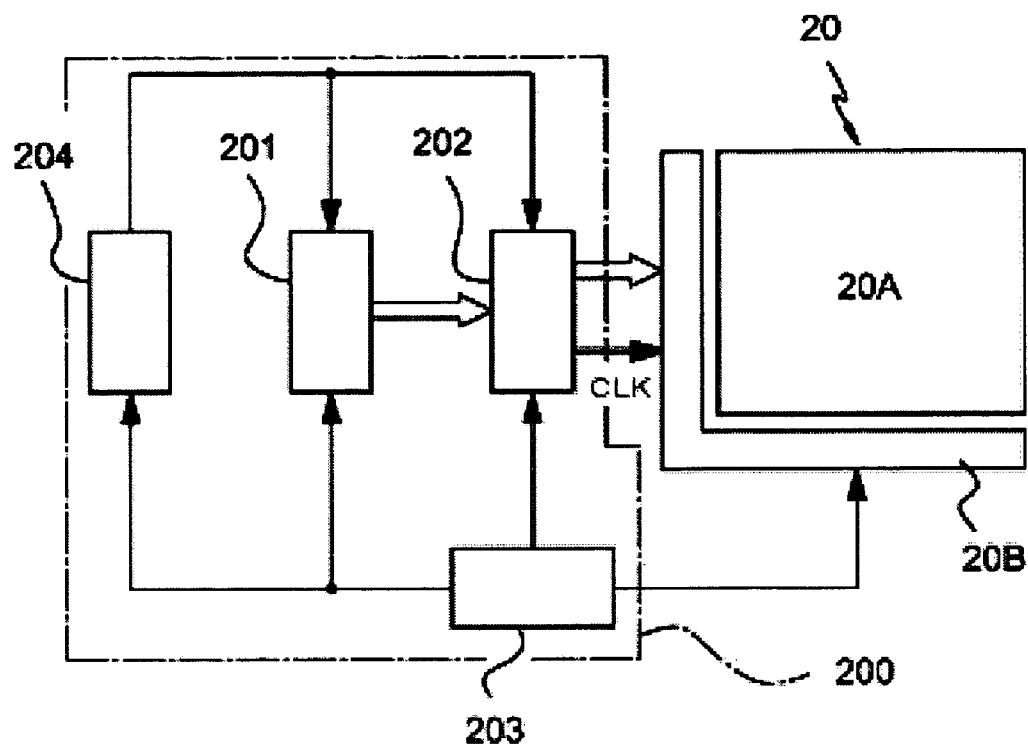
FIG. 22 is a block diagram illustrating the schematic structure of an electronic apparatus according to a sixth embodiment.

FIG. 22 is a block diagram schematically illustrating the overall structure of an electronic apparatus according to this embodiment. The electronic apparatus includes a liquid crystal panel 20 included in a liquid crystal display device and a control unit 200 for controlling the liquid crystal panel 20. In FIG. 22, the liquid crystal panel 20 is conceptually divided into a panel structure 20a and a driving circuit 20b including, for example, a semiconductor device (IC). In addition, the control unit 200 preferably includes a display information output source 201, a display processing circuit 202, a power source circuit 203, and a timing generator 204.

The display information output source 201 includes a memory, such as a read only memory (ROM) or a random access memory (RAM), a storage unit, such as a magnetic recording disc or an optical recording disc, and a tuning circuit for synchronously outputting digital image signals, and supplies display information to the display processing circuit 202 in the form of an image signal having a predetermined format, on the basis of various clock signals generated by the timing generator 204.

The display processing circuit 202 includes various well-known circuits, such as a serial-parallel conversion circuit, an amplification/inversion circuit, a rotation circuit, a gamma correction circuit, and a clamp circuit, and processes input display information to supply the image information to the driving circuit 20b together with a clock signal CLK. In addition, the driving circuit 20b preferably includes a first electrode driving circuit, a second electrode driving circuit, and a test circuit. The power source circuit 203 supplies a predetermined voltage to the above-described components.

Therefore, the electronic apparatus of this embodiment is provided with the liquid crystal display device in which the inclined planes in the step portions between the thick layer portions and the thin layer portions, which constitute a multi-gap structure, are formed in the vertical direction in the display region, and the electrical connection between the electrodes formed on the thick layer portions and the thin layer portions is ensured outboard of the display region. Thus, it is possible to achieve an electronic apparatus capable of displaying an image with good display characteristics.

As described above, according to the invention, the inclined planes in the step portions between the thick layer portions and the thin layer portions, which constitute a multi-gap structure, are formed in the vertical direction in the display region, and the electrical connection between the electrodes formed on the thick layer portions and the thin layer portions is ensured outboard of the display region, which makes it possible to reduce errors in operation and to decrease the area of a display defect region. As a result, it is possible to improve display characteristics of a liquid crystal display device. Thus, the invention can be applied to, for example, a cellular phone, a personal computer, a liquid crystal television set, a viewfinder-type and monitor-direct-view type videotape recorder, a car navigation apparatus, a pager, an electronic organizer, an electronic calculator, a word processor, a work station, a television phone, a POS terminal, and electronic apparatuses equipped with a touch panel.

What is claimed is:

1. A transflective liquid crystal display device comprising:
   a first substrate;
   a second substrate;
   a liquid crystal material interposed between the first substrate and the second substrate;
   a display region including a pixel row of pixels arranged in a predetermined direction, each pixel having a reflective region and a transmissive region, the reflective regions of the pixel row spanning across adjacent pixels of the pixel row in a stripe shape, the transmissive regions of the pixel row spanning across adjacent pixels of the pixel row in a stripe shape;
   a layer-thickness adjusting layer provided in between the first substrate and the liquid crystal material, the layer-thickness adjusting layer including:
      a thick layer portion spanning across the reflective display regions of the pixel row including the pixels arranged in the predetermined direction;
      a step portion between reflective and transmissive regions of corresponding pixels in the display region; and
      a gradual reduction portion formed outboard of the display region, the gradual reduction portion reducing a step difference between reflective and transmissive regions; and
   an electrode formed at the reflective regions and the transmissive regions, the electrode spanning across the pixel row and extending outboard of the display region, the electrode including:
      a first portion extending outboard of the display region, the first portion extending from a portion of the electrode that corresponds to the reflective regions in the pixel row; and
      a second portion extending outboard of the display region, the second portion extending from another portion of the electrode that corresponds to the transmissive regions in the pixel row;
      wherein the first portion and the second portion correspond to same pixel row, and connect to each other through the gradual reduction portion.

2. The transflective liquid crystal display device according to claim 1,
   wherein the gradual reduction portion includes an inclined plane that is slanted at an angle smaller than an angle of inclination of the step portion.

3. The transflective liquid crystal display device according to claim 1,
   wherein the gradual reduction portion includes a plurality of step portions that reduce a step difference between each corresponding reflective region and transmissive region.

4. The transflective liquid crystal display device according to claim 1,
   wherein the portion of the electrode that corresponds to the reflective regions and the portion of the electrode that corresponds to the transmissive regions are electrically connected to each other at both sides of the display region.

5. The transflective liquid crystal display device according to claim 1,
   wherein the electrode has a slit on the step portion in each pixel.

6. The transflective liquid crystal display device according to claim 1,
   wherein the second substrate further comprises an element substrate having at least one of TFD and TFT elements.

7. An electronic apparatus comprising the liquid crystal display device according to claim 1.

8. A transflective liquid crystal display device comprising:
   a first substrate including first electrodes;

a second substrate including second electrodes;
a liquid crystal material interposed between the first substrate and the second substrate; and
a display region including a plurality of pixels each having a reflective region and a transmissive region;
wherein the reflective regions and the transmissive regions are arranged in strip shapes so as to be laid across pixel rows each composed of pixels arranged in a predetermined direction in the display region,
the first substrate includes a layer-thickness adjusting layer adjusting retardation in the reflective regions and the transmissive regions,
the layer-thickness adjusting layer includes:
  thick layer portions arranged in the reflective regions;
  thin layer portions arranged in the transmissive regions;
  step portions formed, in the display region, at boundaries between the thick layer portions and the thin layer portions such that first inclined planes thereof are formed in a vertical direction; and
  relieving portions formed outboard of the display region to reduce a step difference between the thick layer portions and the thin layer portions,
the first electrodes are formed on the layer-thickness adjusting layer so as to be laid across the pixel rows, and extend outboard of the display region,
the first electrodes formed in the reflective regions and the transmissive regions in the same pixel row are connected to each other on the relieving portions, and
in the display region, an angle of inclination of the step portion is in a range of 60° to 90°.

9. A transflective liquid crystal display device comprising:
a first substrate;
a second substrate;
a liquid crystal material interposed between the first substrate and the second substrate;
a display region including a pixel row of pixels arranged in a predetermined direction, each pixel having a reflective region and a transmissive region, the reflective regions of the pixel row spanning across adjacent pixels of the pixel row in a stripe shape, the transmissive regions of the pixel row spanning across adjacent pixels of the pixel row in a stripe shape;
a layer-thickness adjusting layer provided between the first substrate and the liquid crystal material, the layer-thickness adjusting layer including:
  a thick layer portion corresponding to the reflective regions spanning across the reflective display regions of the pixel row including the pixels arranged in the predetermined direction;
  a step portion between reflective and transmissive regions of corresponding pixels in the display region; and
  a gradual reduction portion formed outboard of the display region, the gradual reduction portion reducing a step difference between reflective and transmissive regions; and
an electrode formed at the reflective regions and the transmissive regions, the electrode spanning across the pixel row and extending outboard of the display region, the electrode including:
  a first portion extending outboard of the display region, the first portion extending from a portion of the electrode that corresponds to the reflective regions in the pixel row; and
  a second portion extending outboard of the display region, the second portion extending from another portion of the electrode that corresponds to the transmissive regions in the pixel row; and
  a conductive material arranged to span across the first portion and the second portion.

10. A method of manufacturing a transflective liquid crystal display device that includes a first substrate; a second substrate; a liquid crystal material that is interposed between the first substrate and the second substrate; and a display region including a pixel row of pixels arranged in a predetermined direction, each pixel having a reflective region and a transmissive region, the reflective regions of the pixel row spanning across adjacent pixels of the pixel row in a stripe shape, the transmissive regions of the pixel row spanning across adjacent pixels of the pixel row in a stripe shape, the method comprising:
forming a photosensitive resin material layer on the first substrate;
forming a layer-thickness adjusting layer between the first substrate and the liquid crystal layer that includes:
  a thick layer portion spanning across the reflective display regions of the pixel row including the pixels arranged in the predetermined direction;
  a step portion between reflective and transmissive regions of corresponding pixels in the display region; and
  a gradual reduction portion formed outboard of the display region, the gradual reduction portion reducing a step difference between reflective and transmissive regions;
forming an electrode at the reflective regions and the transmissive regions, the electrode spanning across the pixel row and extending outboard of the display region, the electrode including:
  a first portion extending outboard of the display region, the first portion extending from a portion of the electrode that corresponds to the reflective regions in the pixel row, and
  a second portion extending outboard of the display region, the second portion extending from another portion of the electrode that corresponds to the transmissive regions in the pixel row,
  wherein the first portion and the second portion are connected to each other through the gradual reduction portion.

11. A method of manufacturing a transflective liquid crystal display device which includes a first substrate; a second substrate; a liquid crystal material that is interposed between the first substrate and the second substrate; and a display region including a pixel row of pixels arranged in a predetermined direction, each pixel having a reflective region and a transmissive region, the reflective regions of the pixel row spanning across adjacent pixels of the pixel row in a stripe shape, the transmissive regions of the pixel row spanning across adjacent pixels of the pixel row in a stripe shape, the method comprising:
forming a photosensitive resin material layer on the first substrate;
forming a layer-thickness adjusting layer that includes:
  a thick layer portion spanning across the reflective display regions of the pixel row including the pixels arranged in the predetermined direction;
  a step portion between reflective and transmissive regions of corresponding pixels in the display region; and a gradual reduction portion formed outboard of the display region, the gradual reduction portion reducing a step difference between reflective and transmissive regions;

forming an electrode at the reflective regions and the transmissive regions, the electrode spanning across the pixel row and extending outboard of the display region; and arranging a conductive material to span across a first portion and a second portion of the electrode, the first portion extending outboard of the display region, the first portion extending from a portion of the electrode that corresponds to the reflective regions in the pixel row, the second portion extending outboard of the display region, the second portion extending from another portion of the electrode that corresponds to the transmissive regions in the pixel row.

* * * * *